Feb. 4, 1936.     H. W. RUPPEL     2,029,638
AUTOMATIC LATHE
Filed Jan. 25, 1933     26 Sheets-Sheet 15

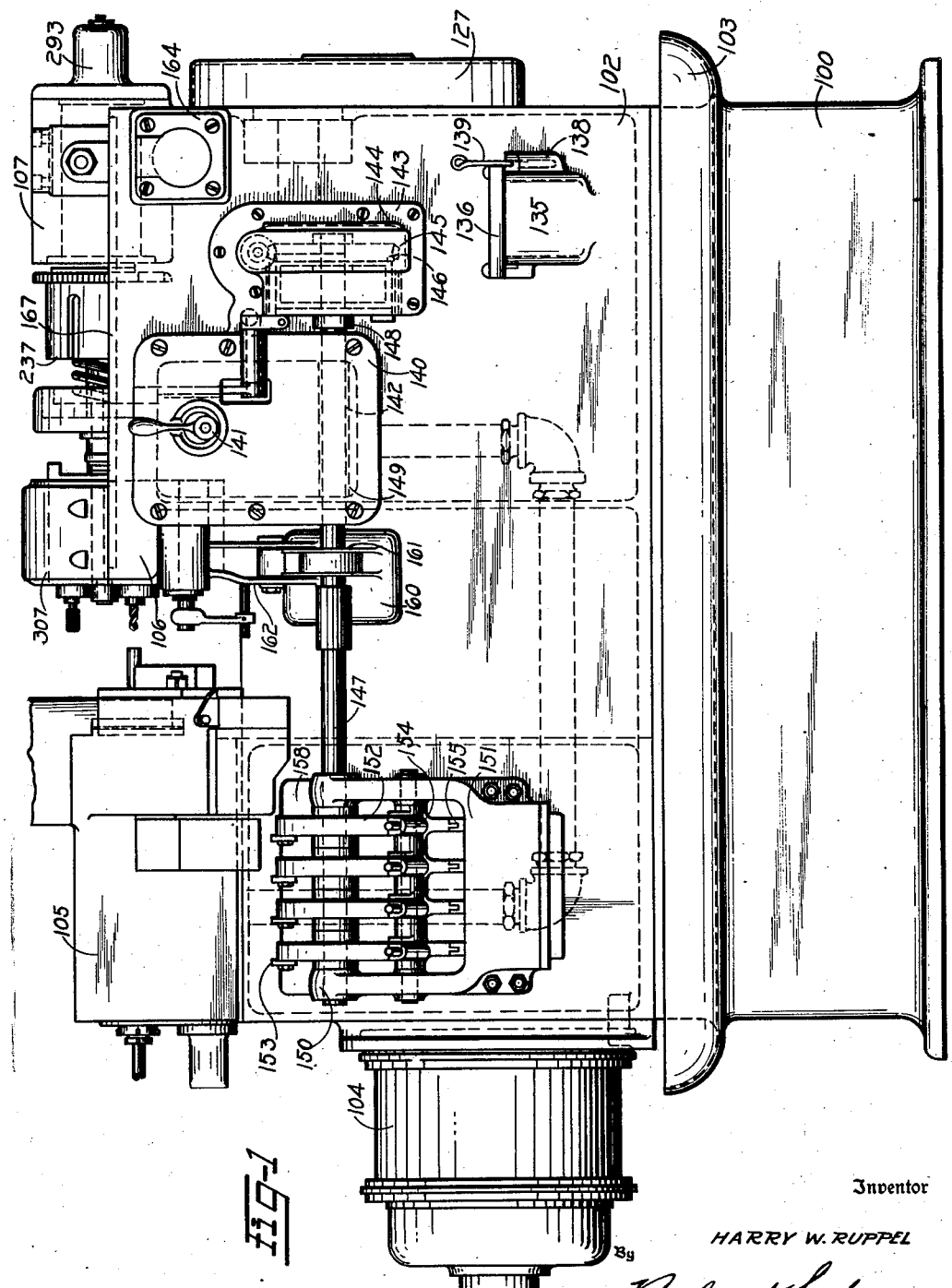

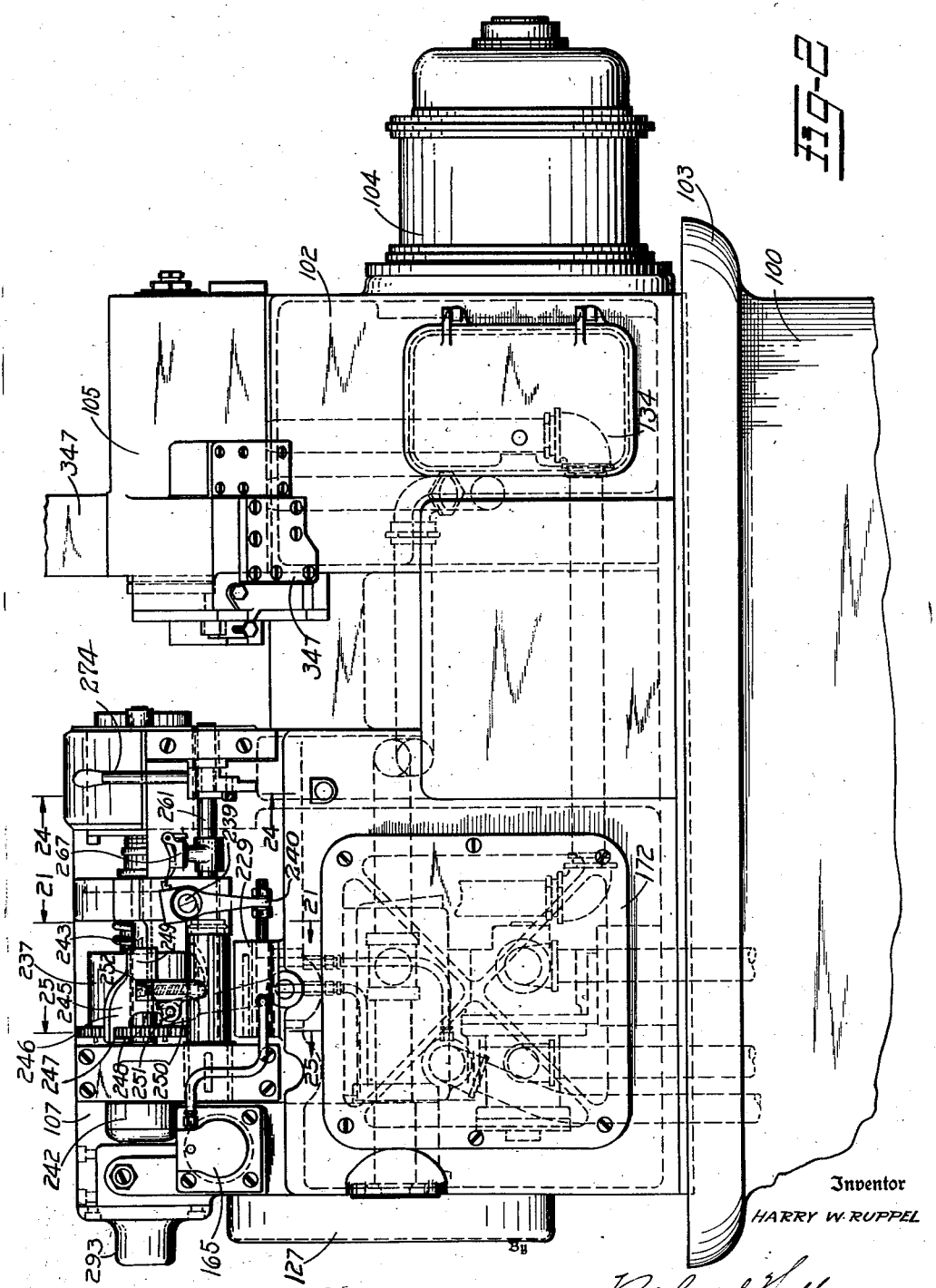

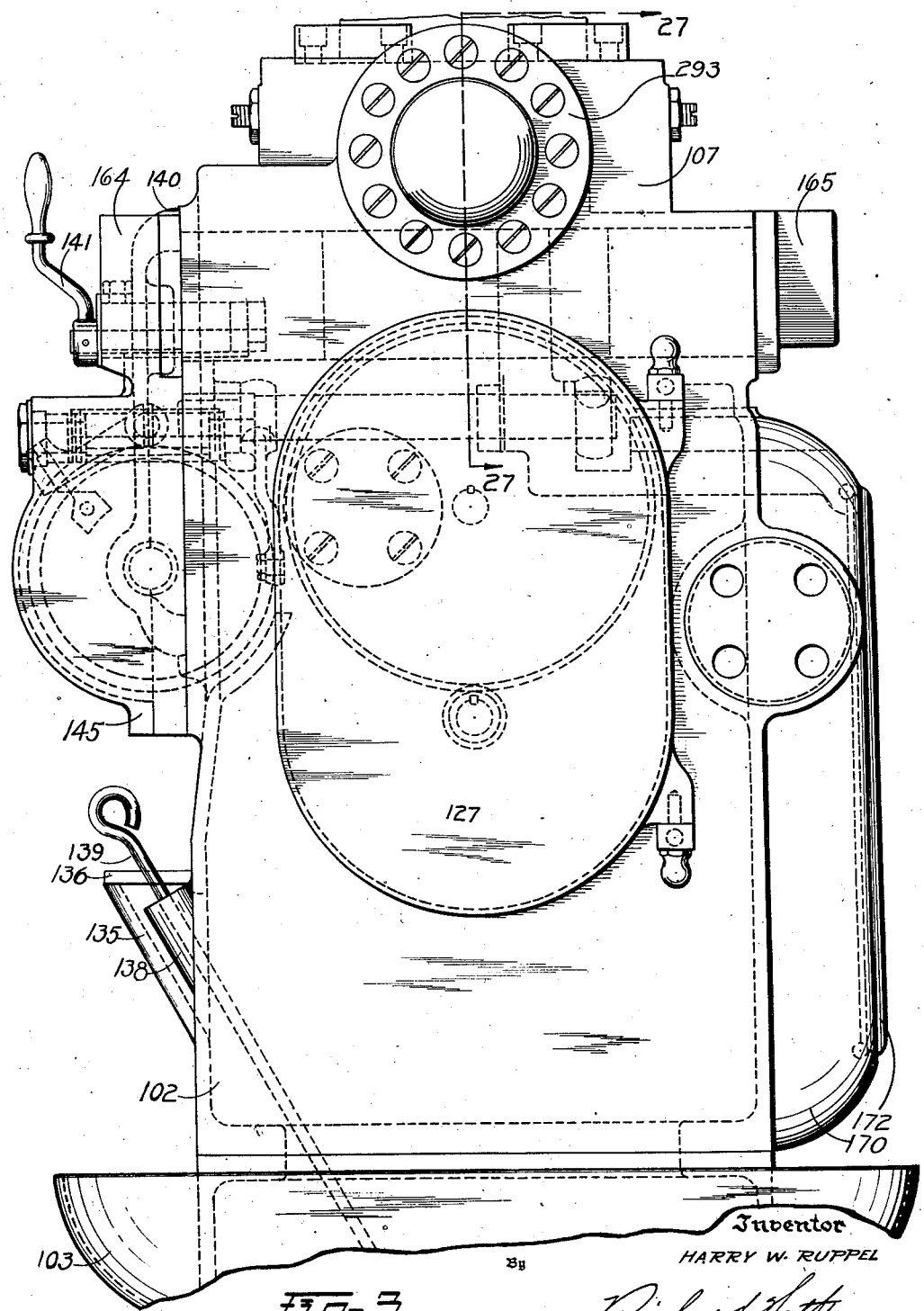

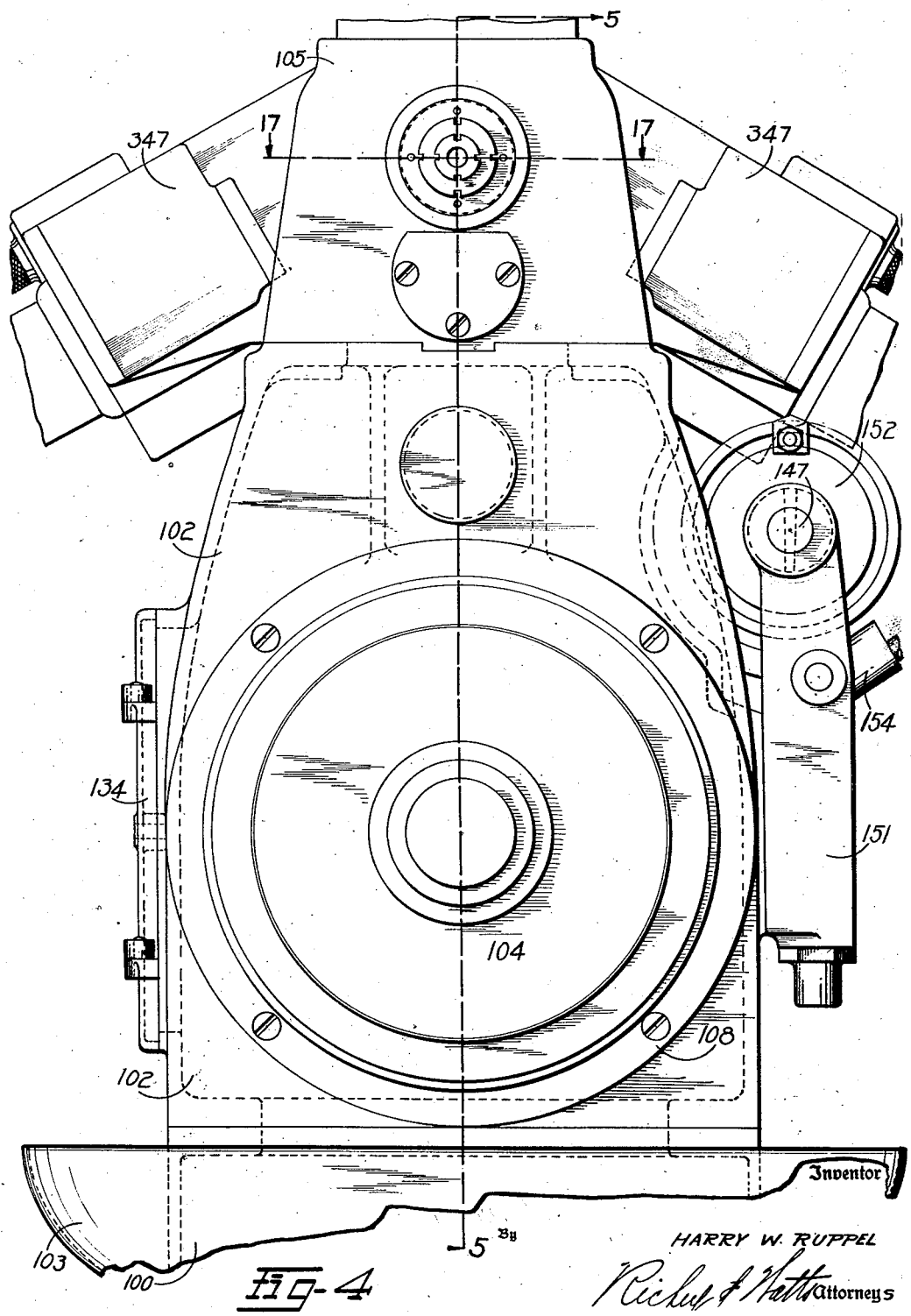

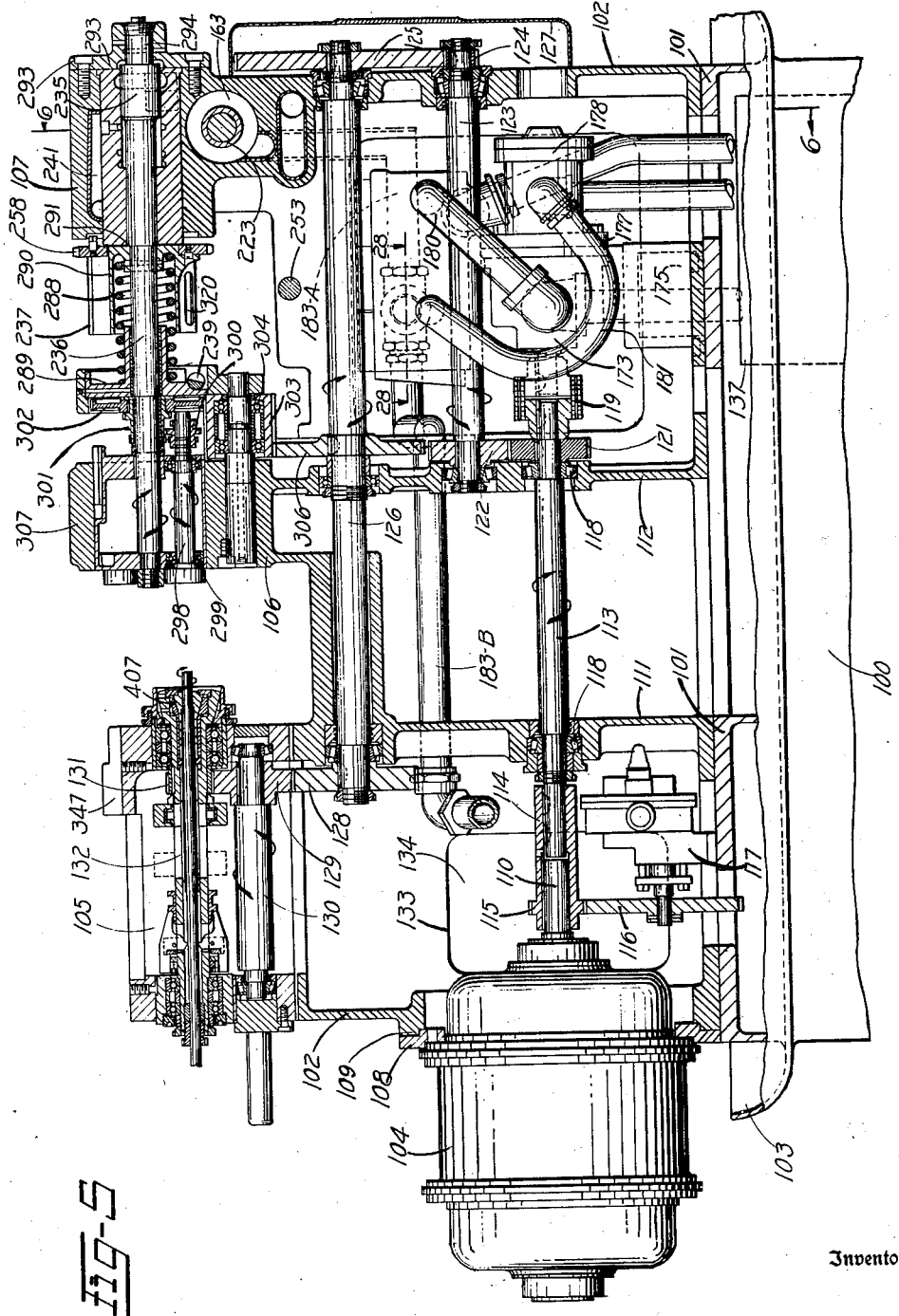

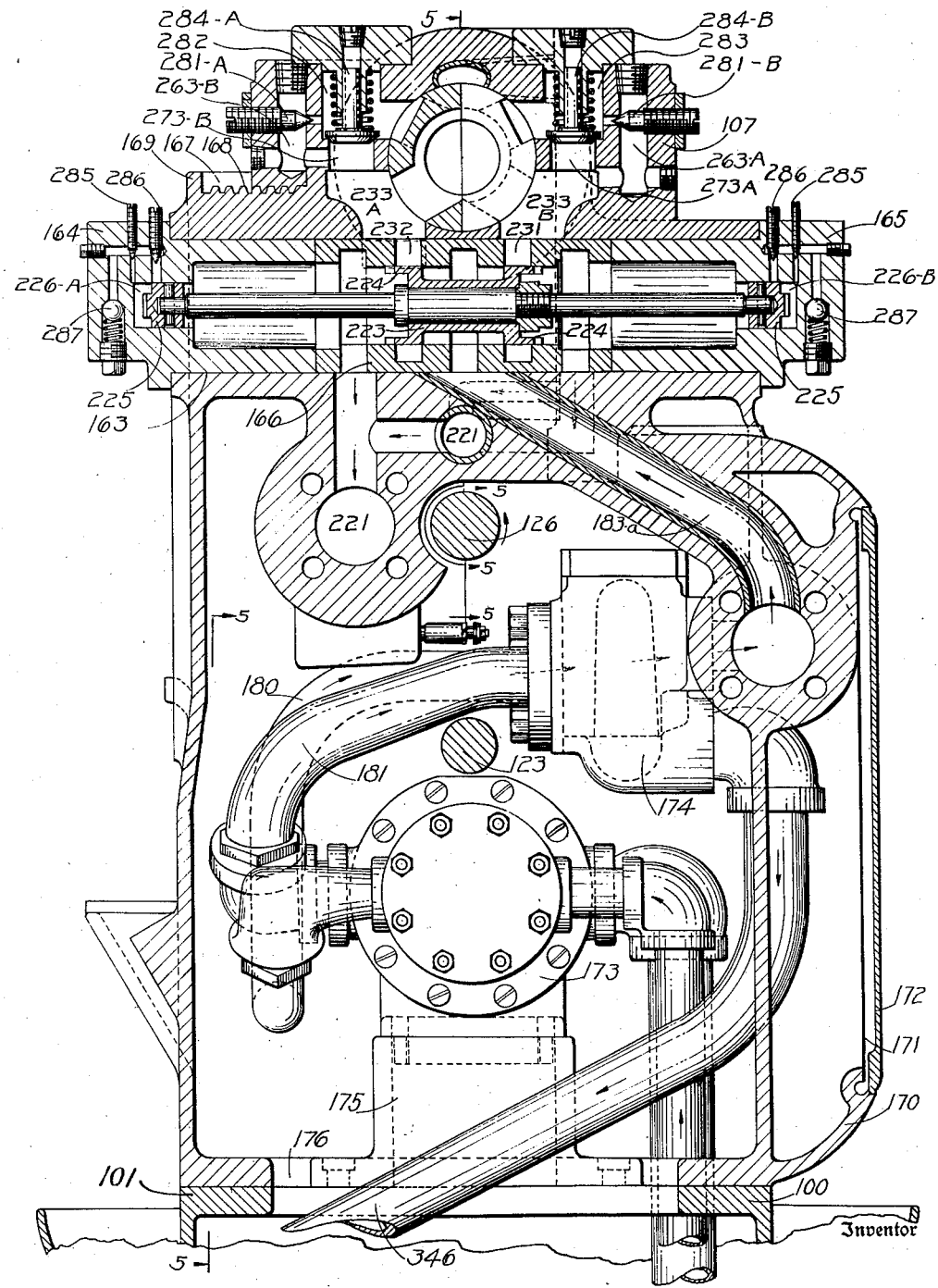

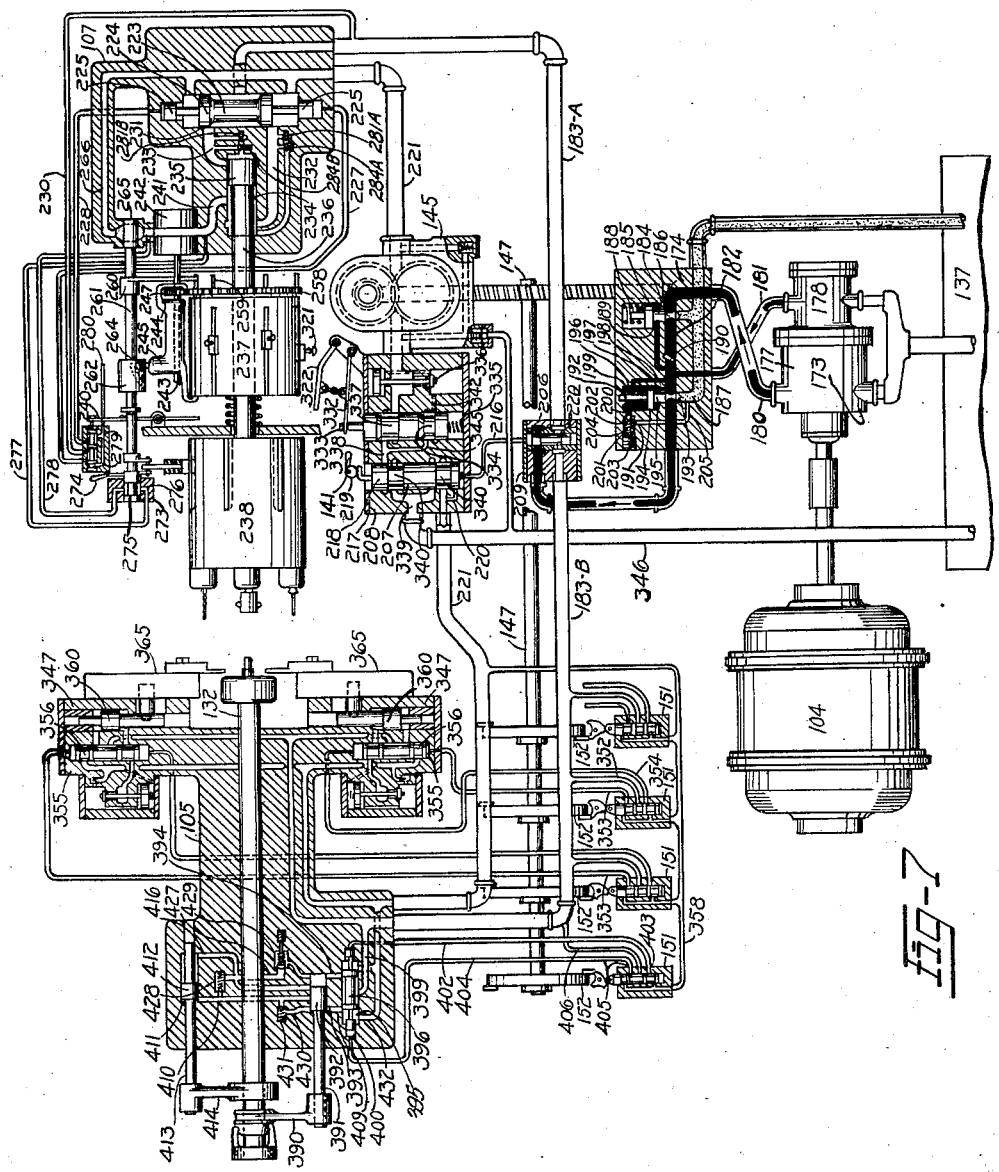

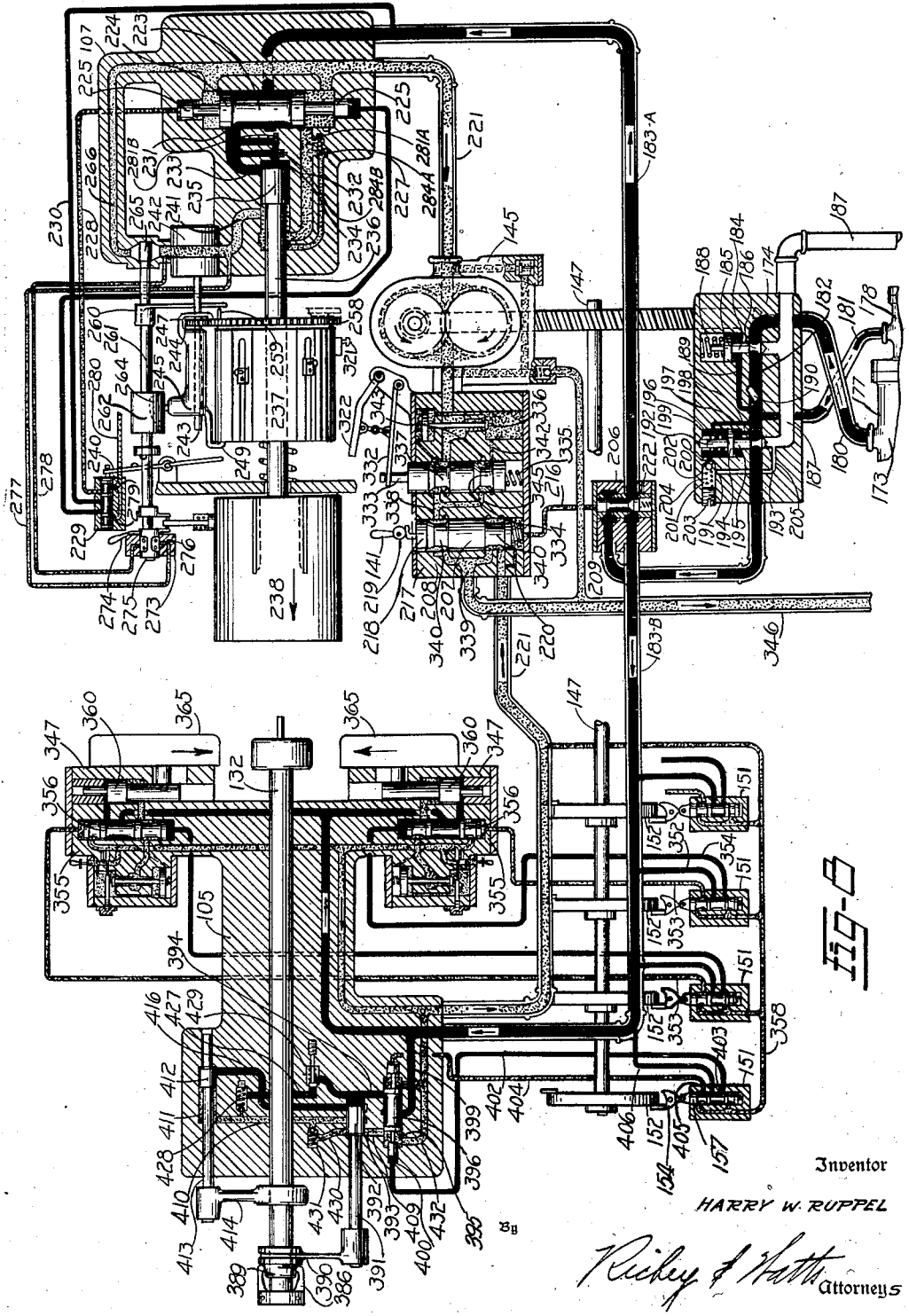

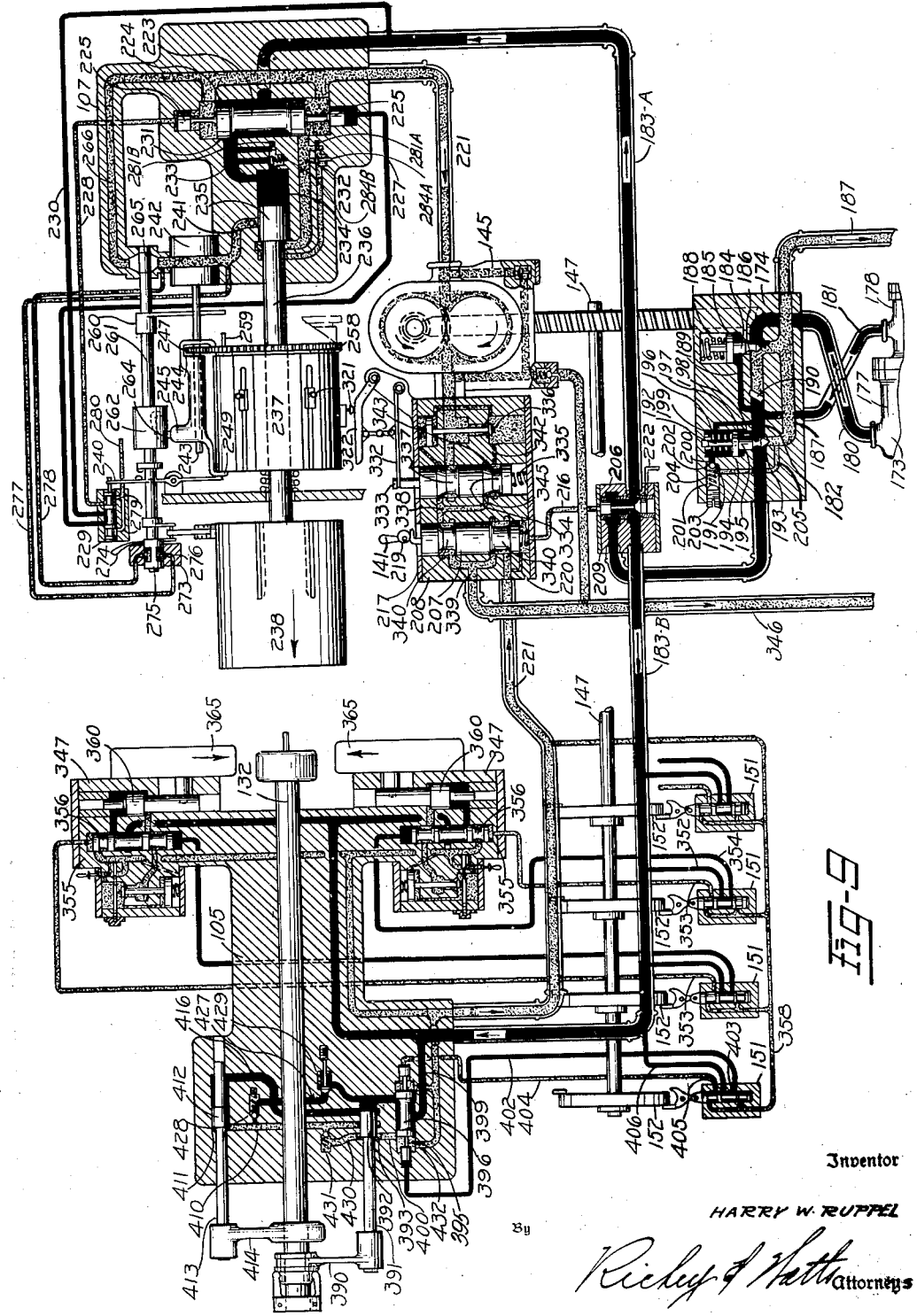

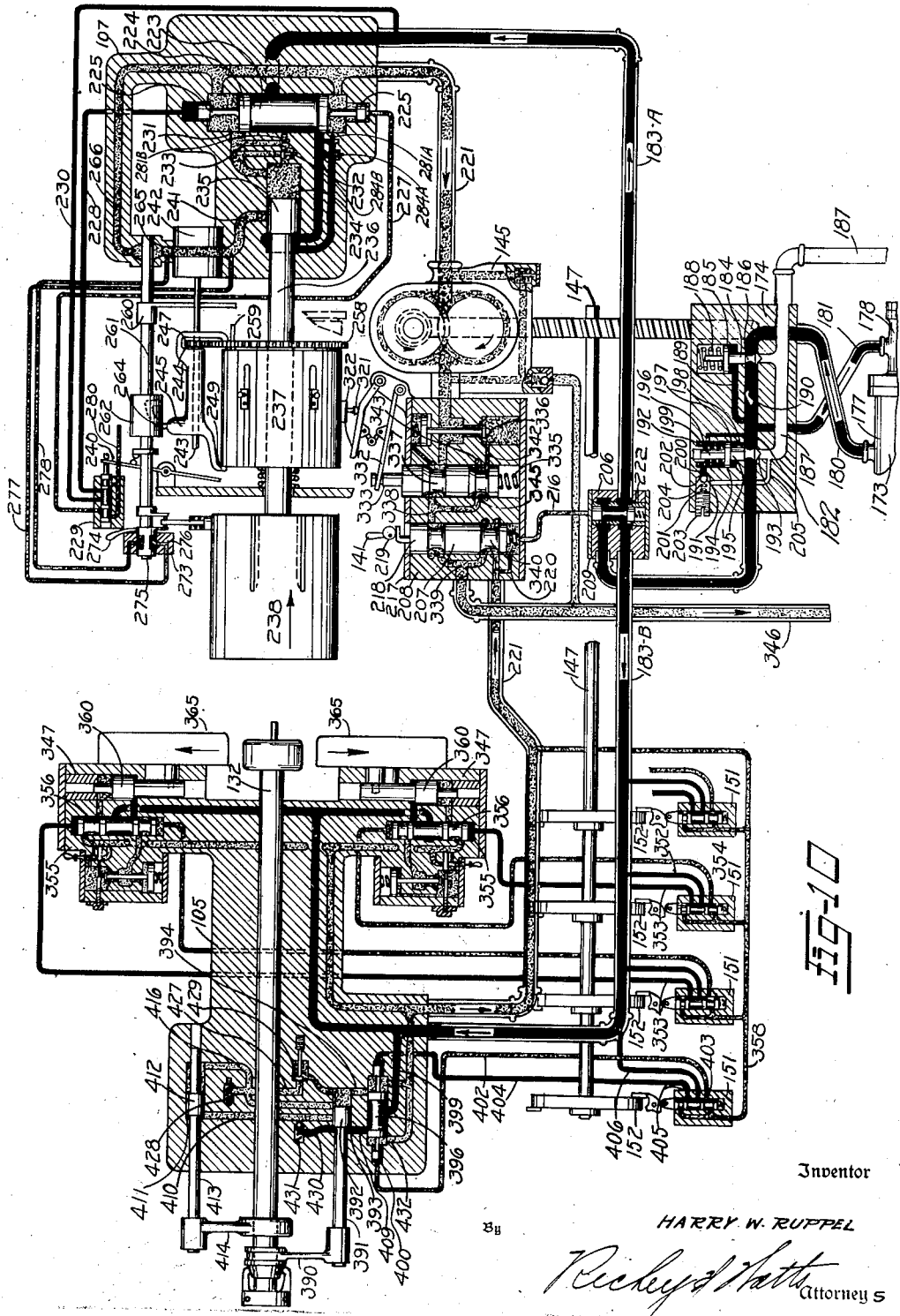

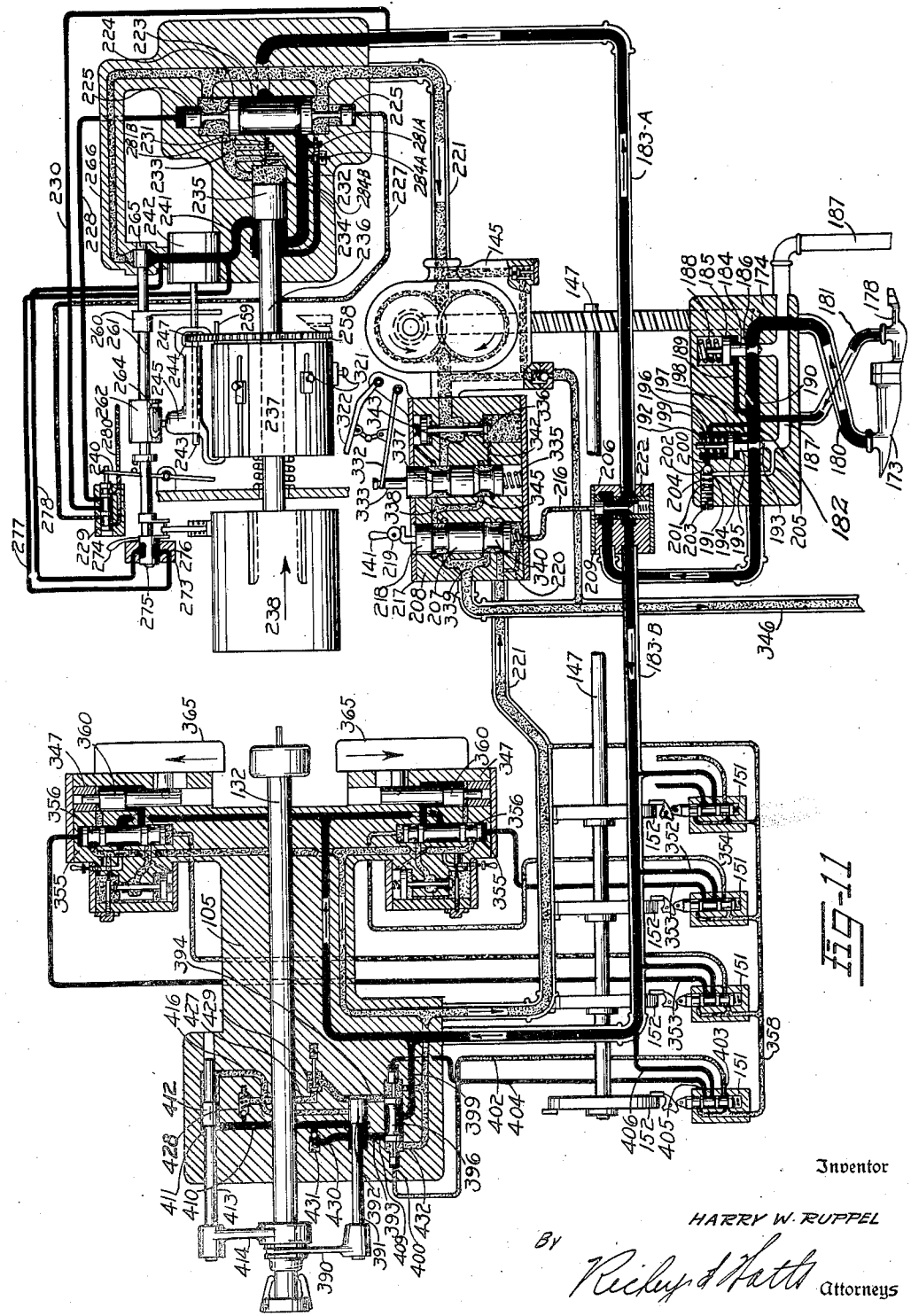

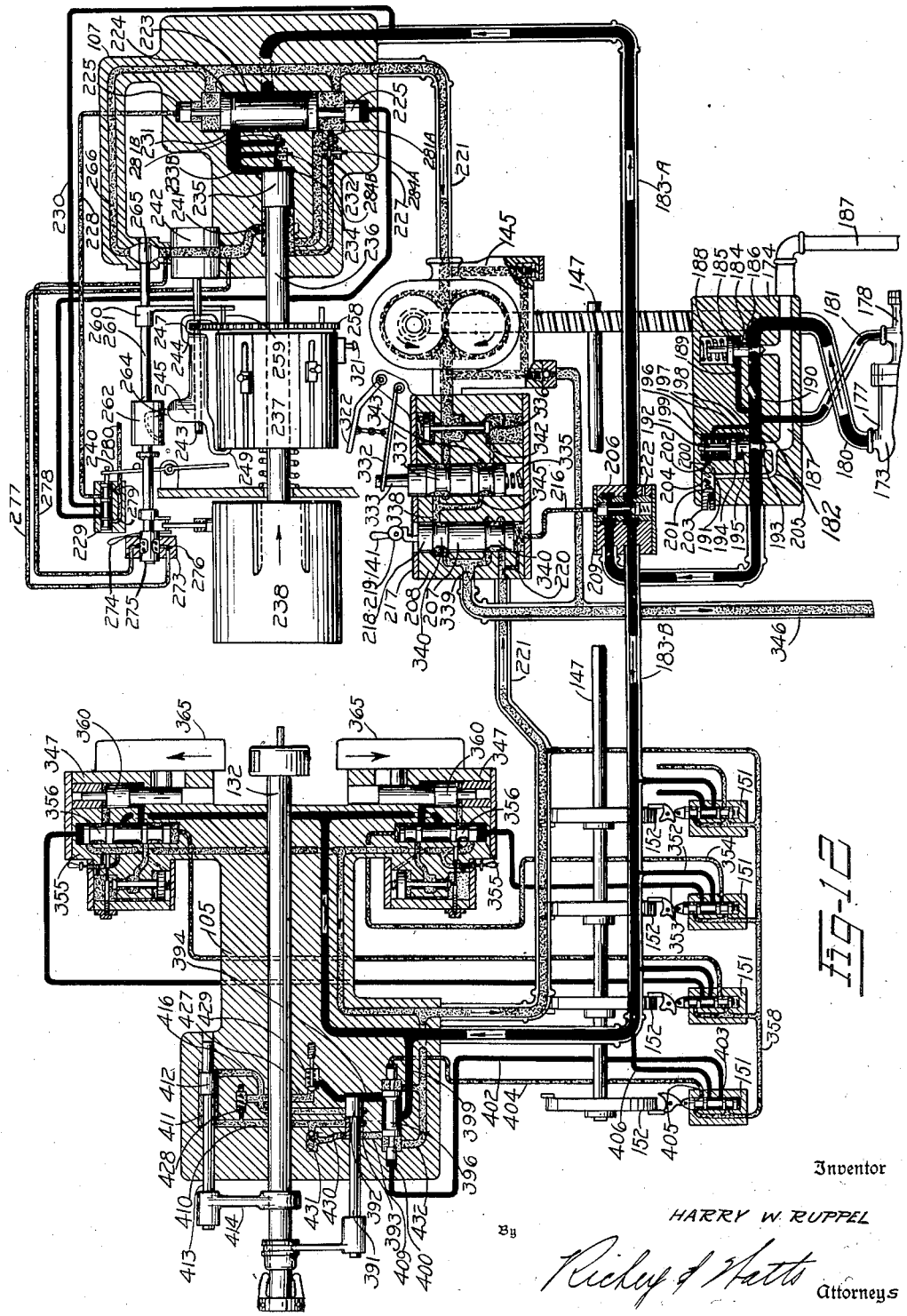

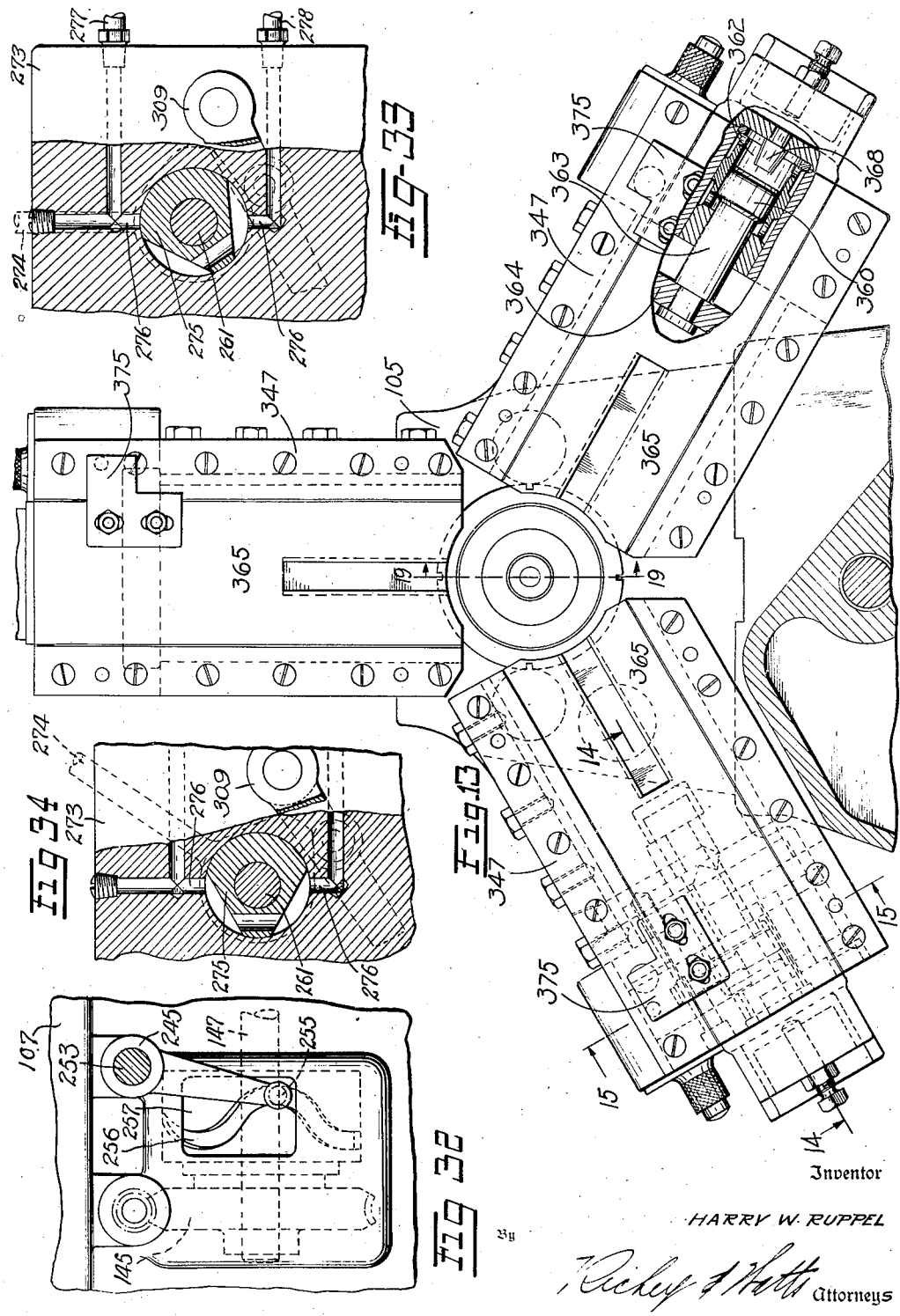

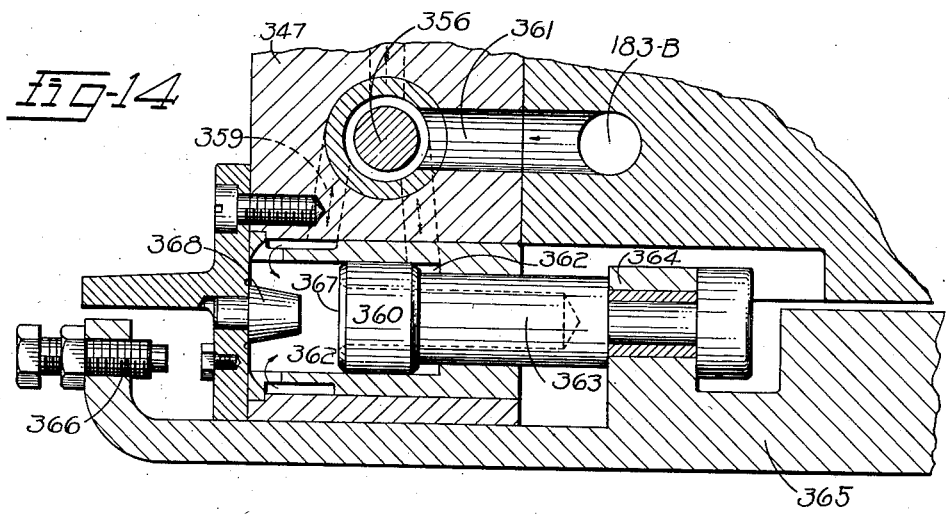
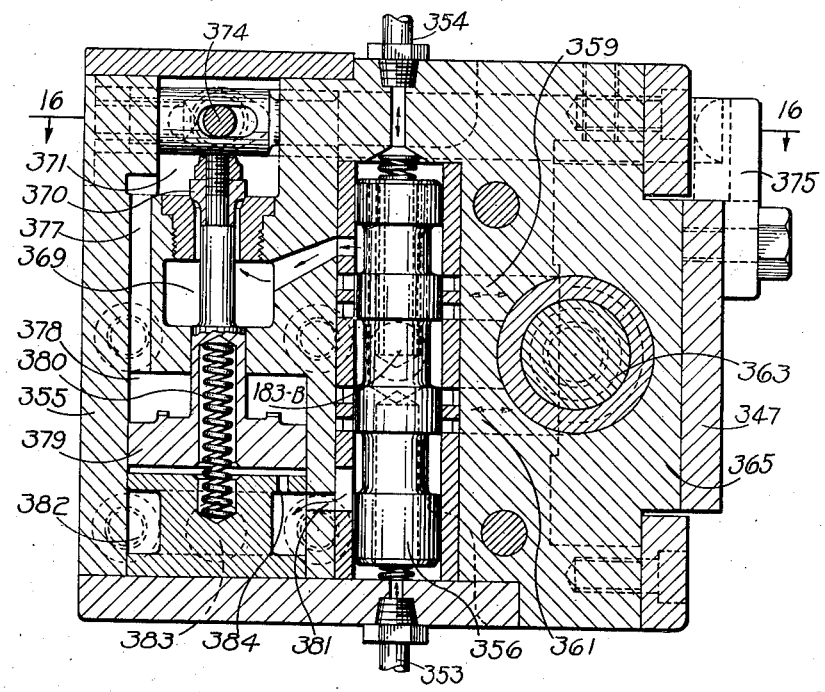

Inventor
HARRY W. RUPPEL

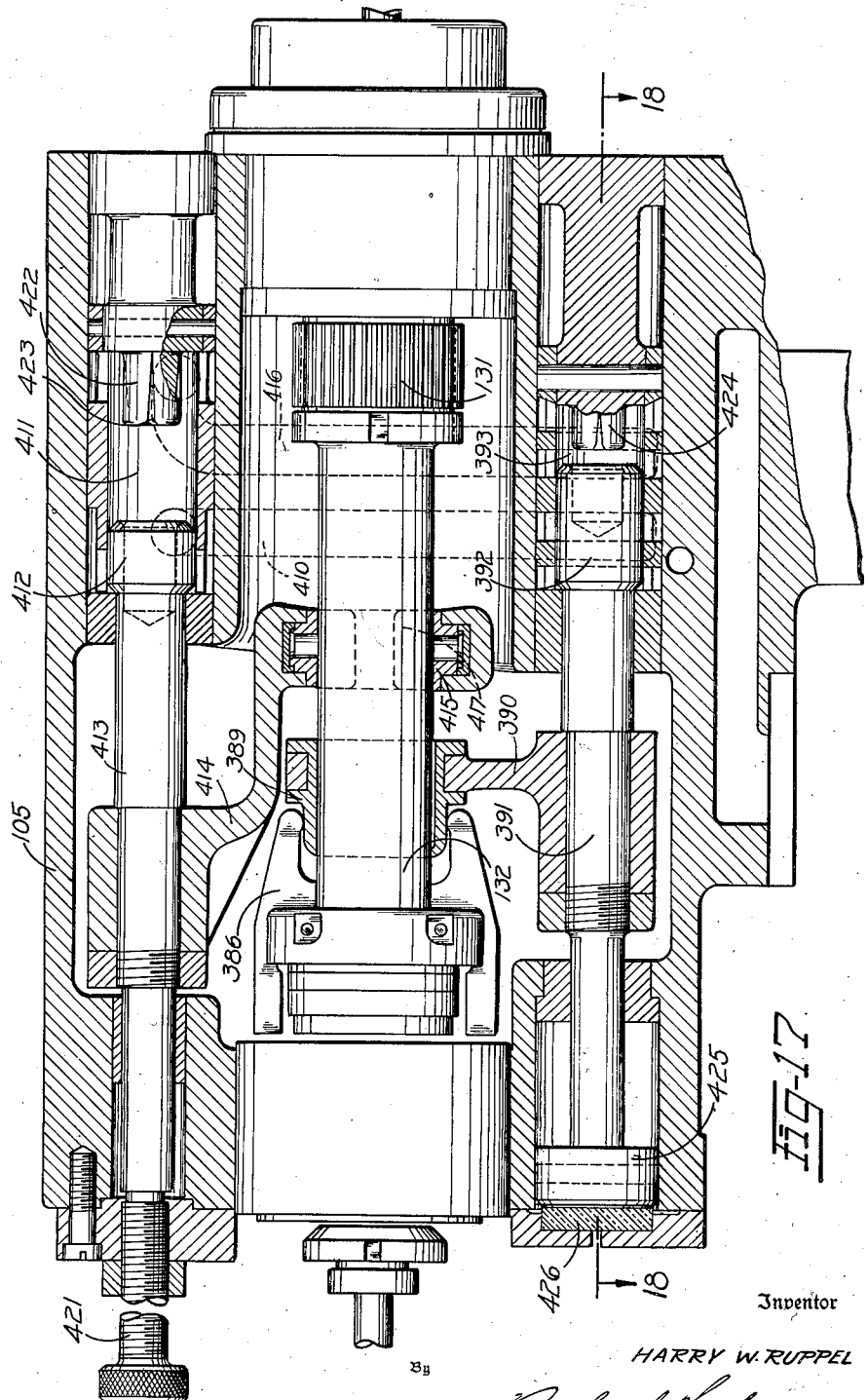

Feb. 4, 1936.  H. W. RUPPEL  2,029,638
AUTOMATIC LATHE
Filed Jan. 25, 1933   26 Sheets-Sheet 17
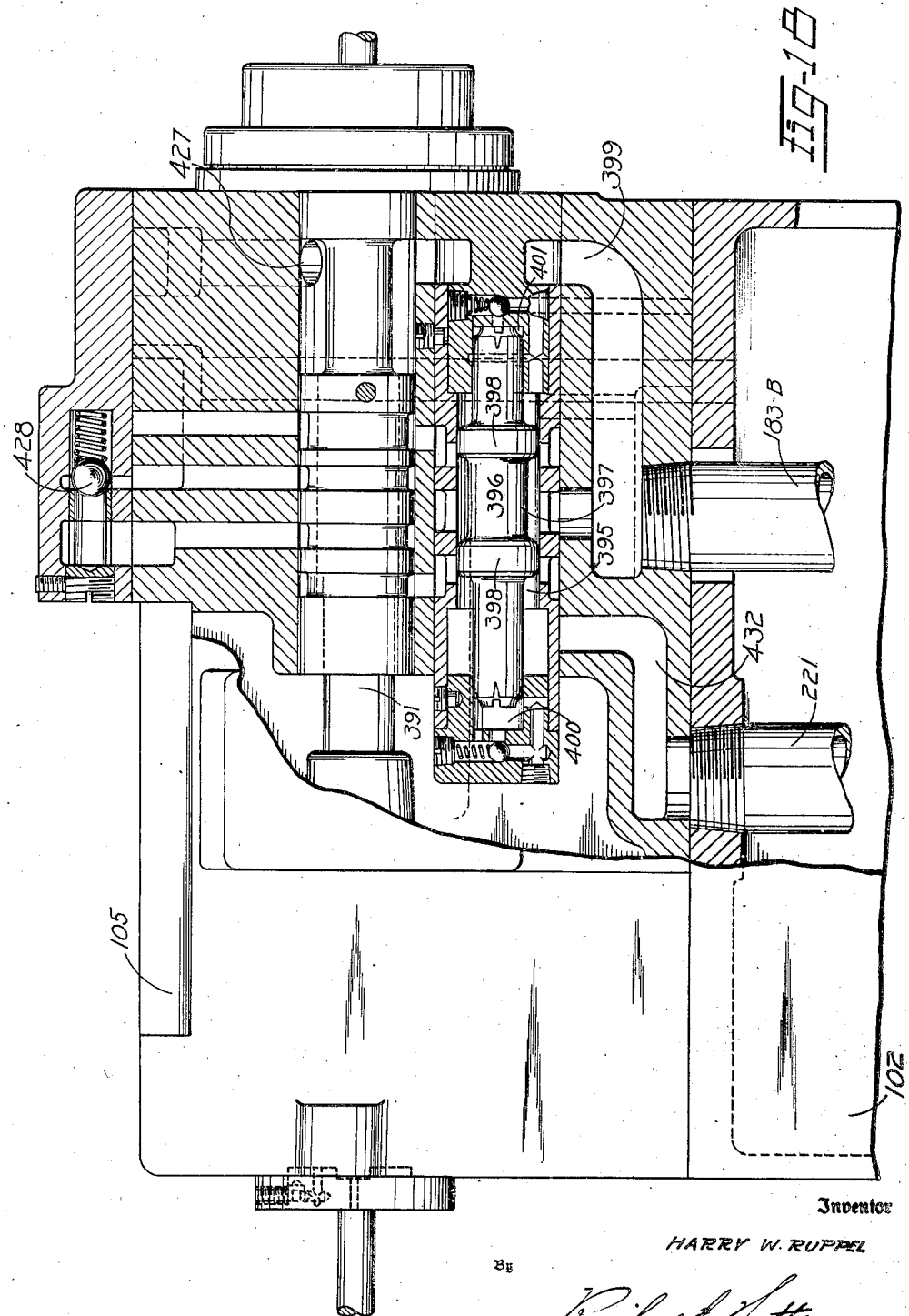
Inventor
HARRY W. RUPPEL
By
Richey & Watts Attorneys

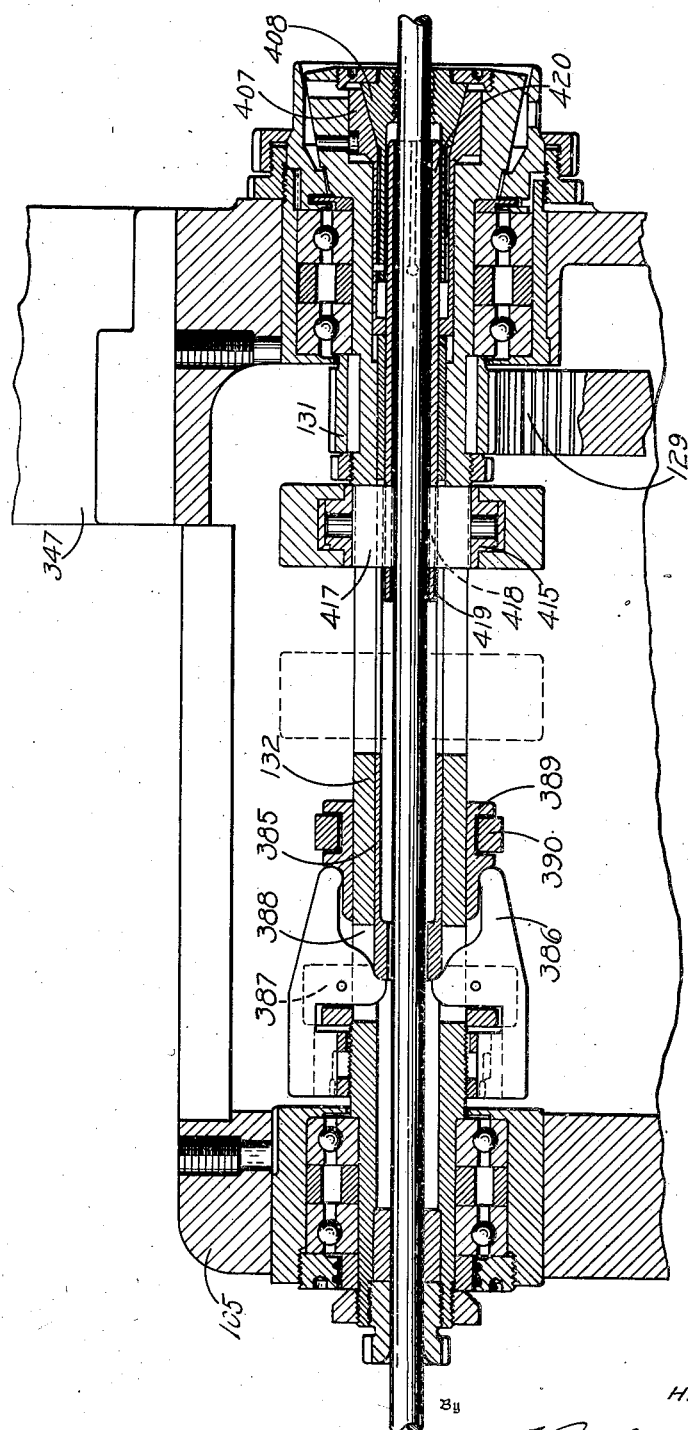

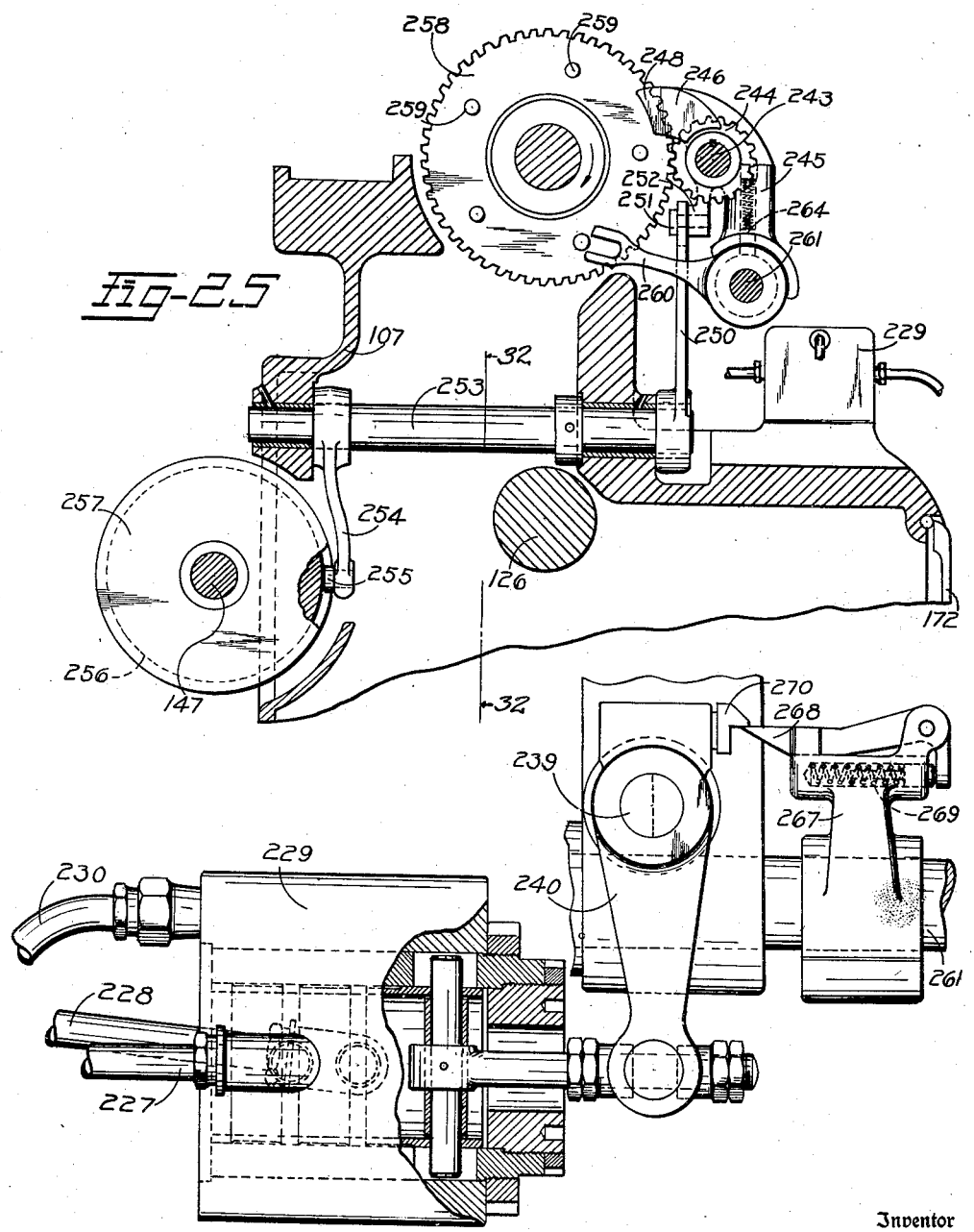

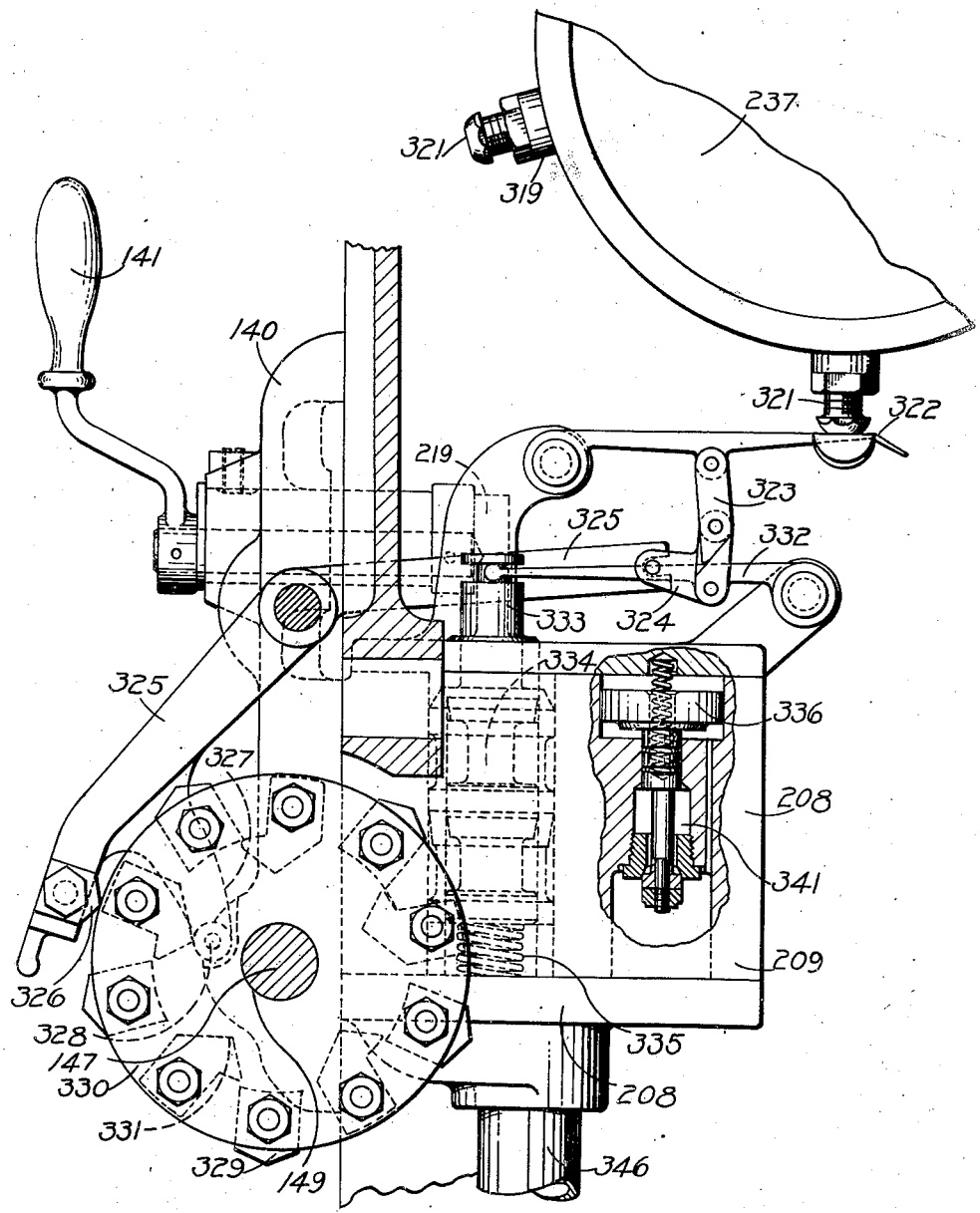

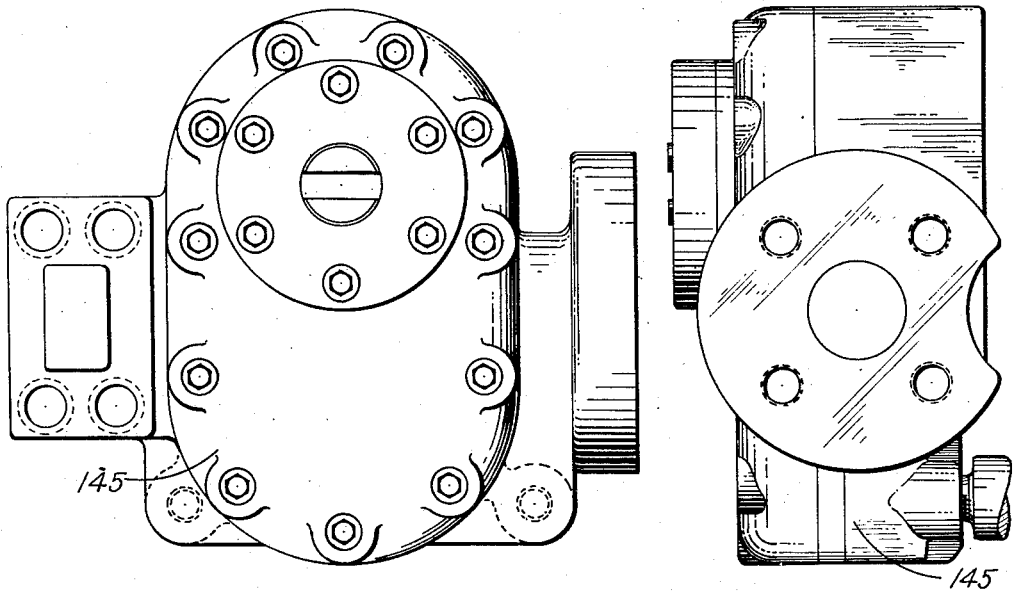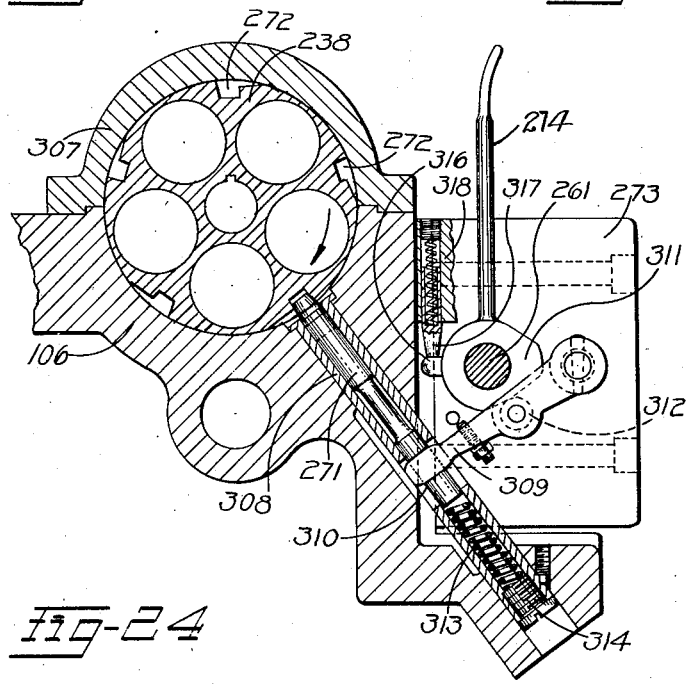

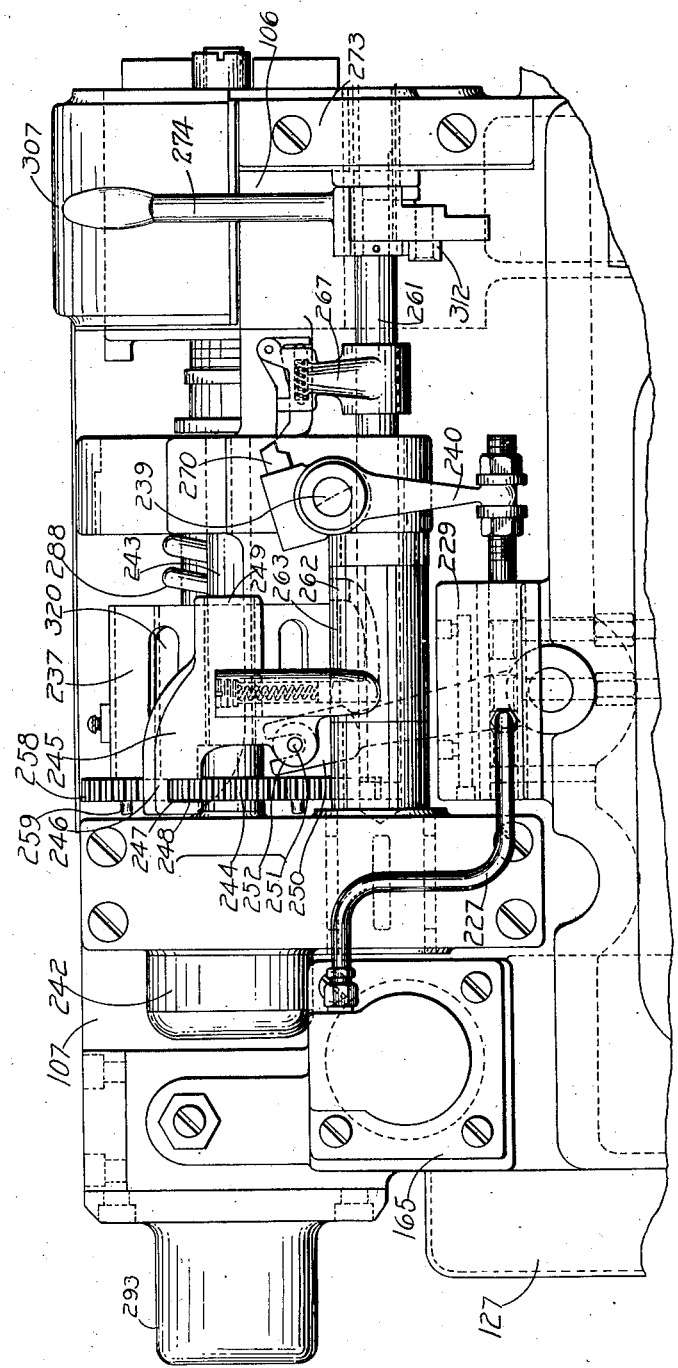

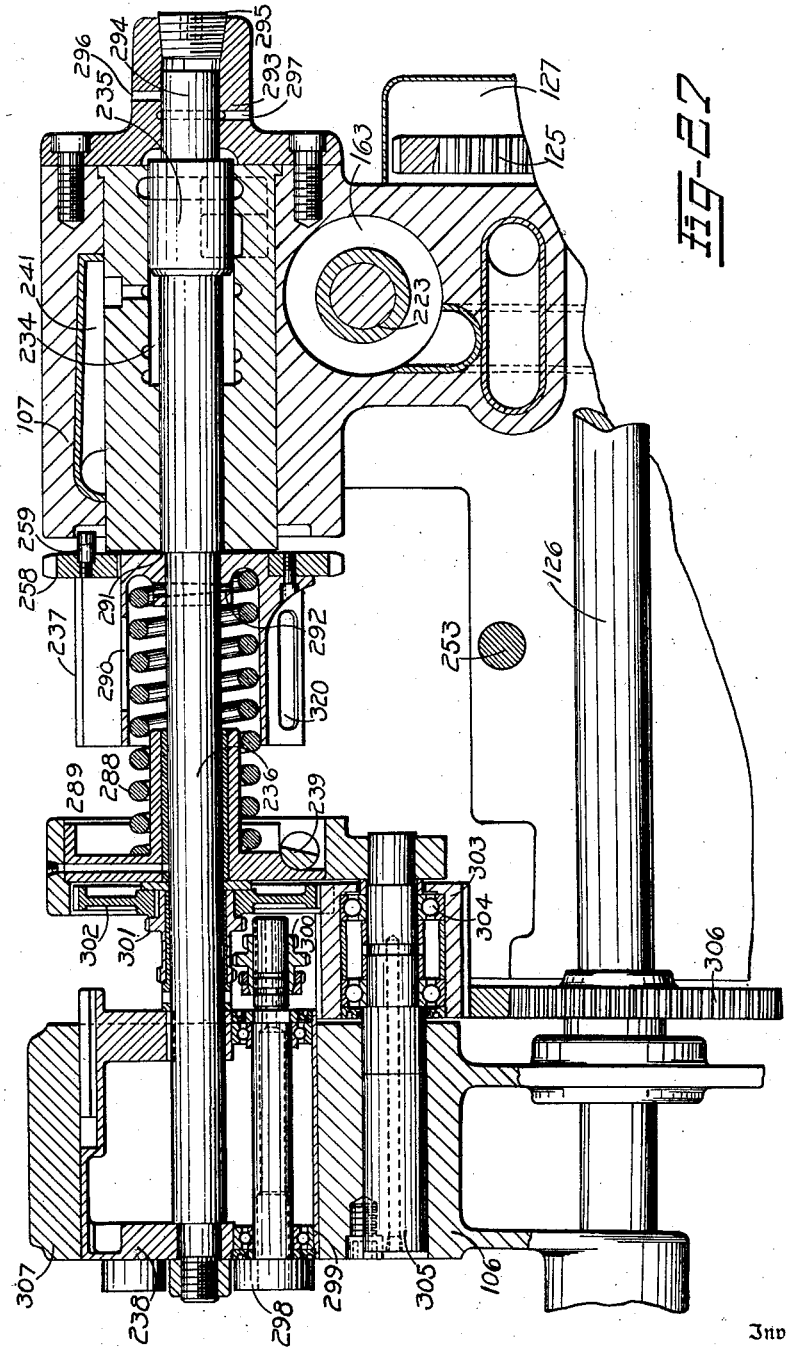

Feb. 4, 1936.  H. W. RUPPEL  2,029,638
AUTOMATIC LATHE
Filed Jan. 25, 1933   26 Sheets-Sheet 24
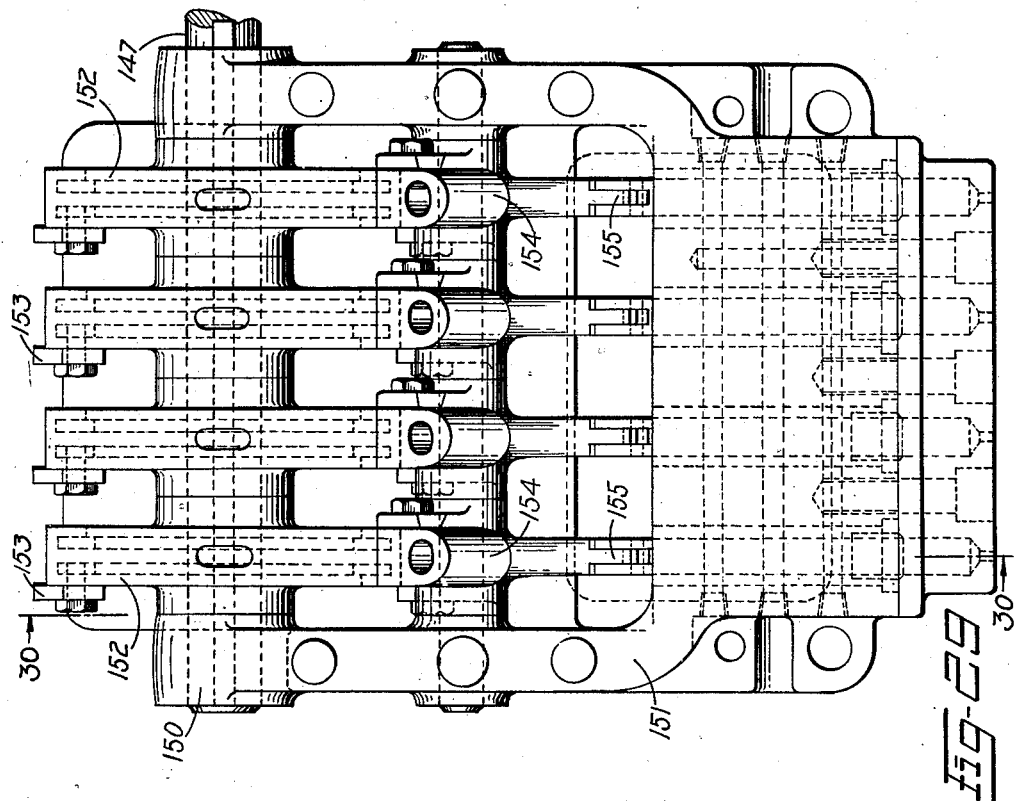
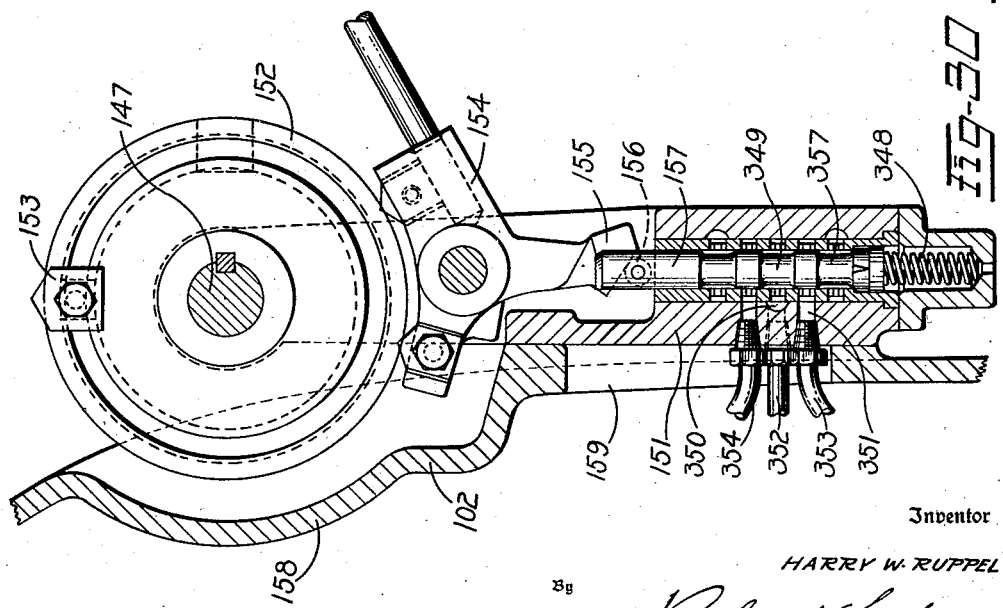
Inventor
HARRY W. RUPPEL
By
Attorneys

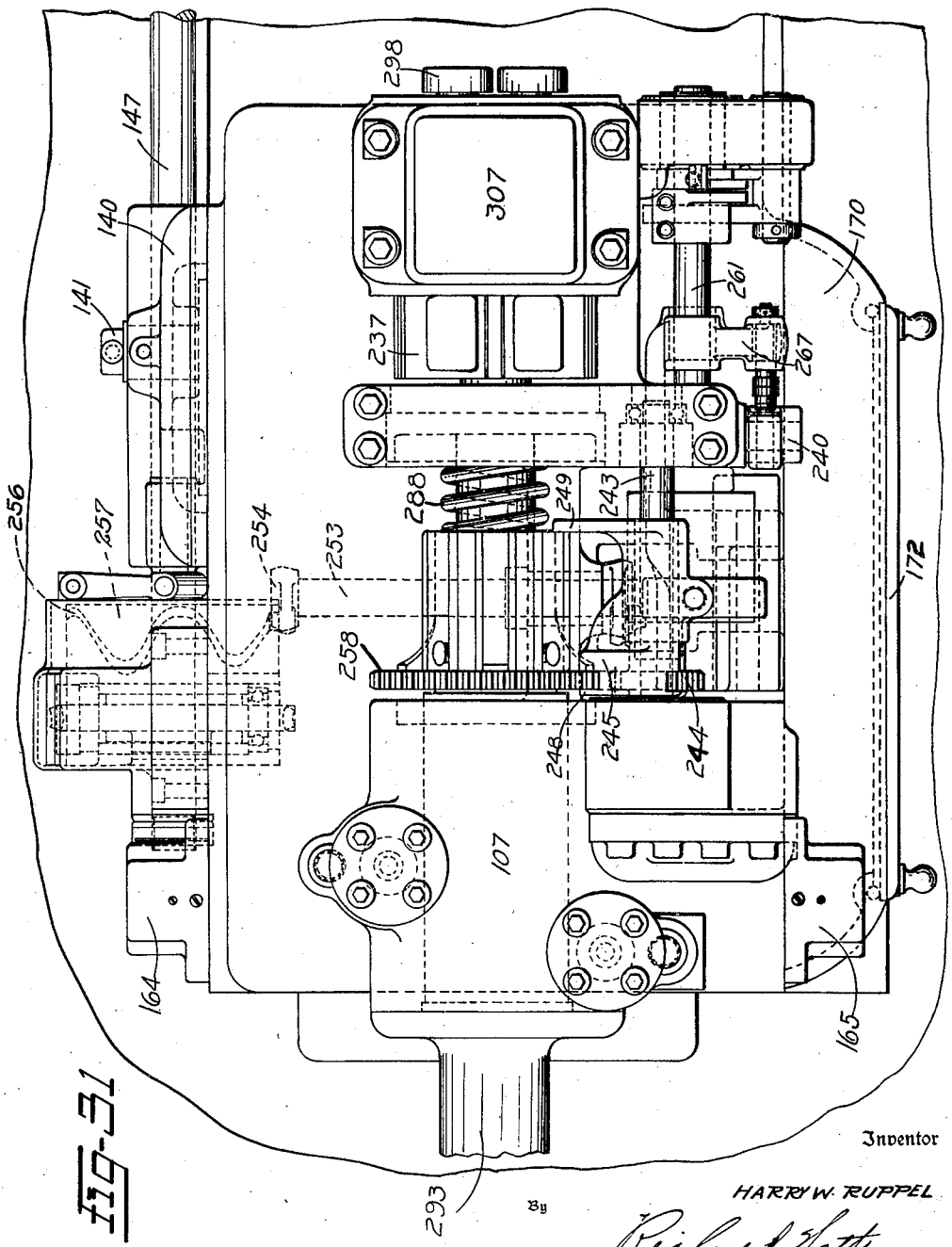

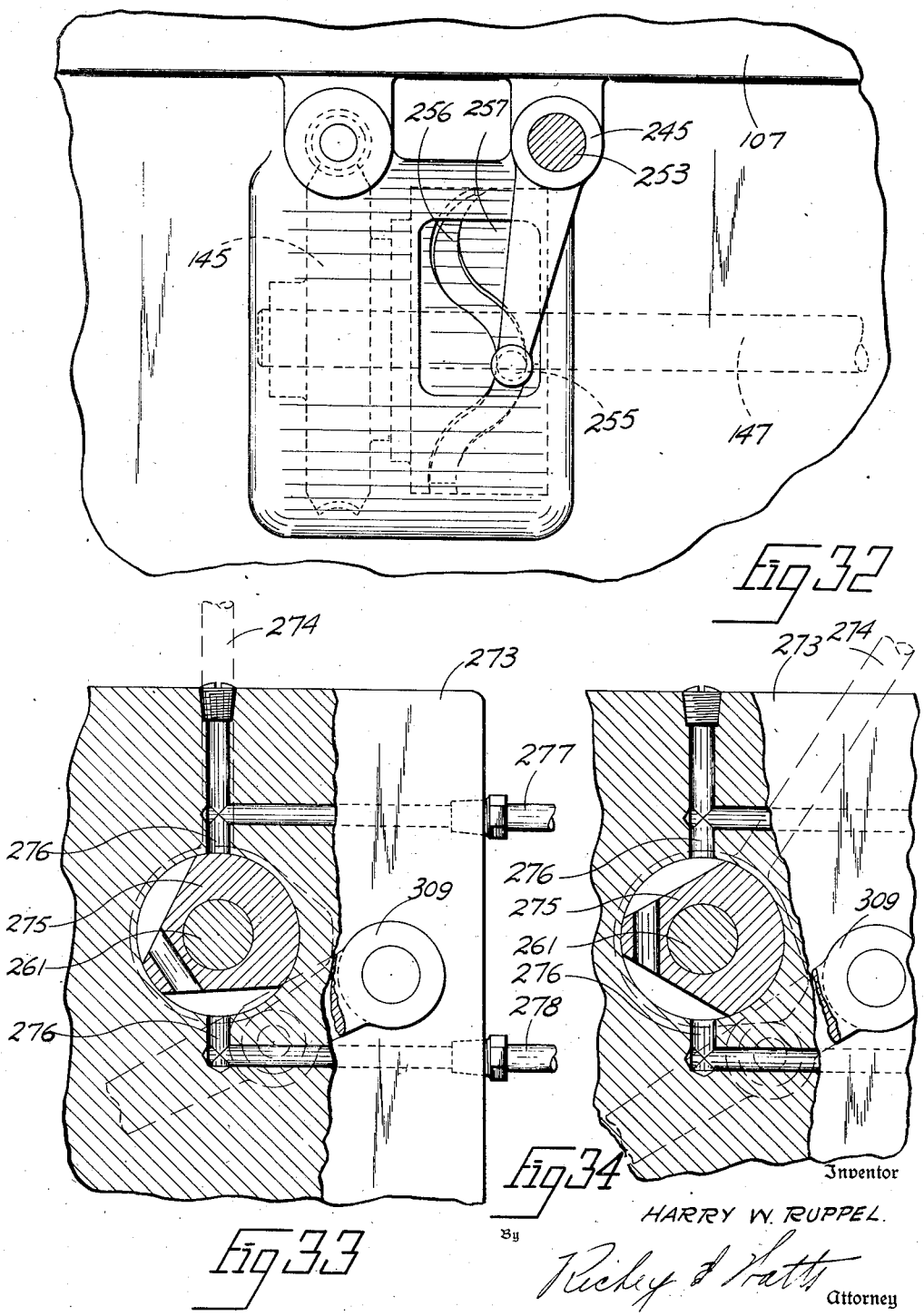

Patented Feb. 4, 1936

2,029,638

UNITED STATES PATENT OFFICE 2,029,638

AUTOMATIC LATHE

Harry W. Ruppel, Shaker Heights, Ohio, assignor to The Cleveland Automatic Machine Company, Cleveland, Ohio, a corporation of Ohio Application January 25, 1933, Serial No. 653,432

20 Claims. (Cl. 29—42)

This invention relates broadly to lathes of the type commercially known as automatic screw machines and more specifically to a hydraulic transmission mechanism, organized within such machines, to effect the automatic movement and cyclic control of the cutting tools and their appurtenances.

A full automatic screw machine, as lathes of this character are frequently called, comprises generally, a machine tool having a hollow rotatable spindle adapted to intermittently feed and progressively form the work. Within the cycle of operation of such machines the tools are advanced, in order, into engagement with the work, usually bar stock or rods, where they dwell or are fed requisite with the machining operation to be performed. The movement of the tools, the order of application and tool operating time thereof is customarily controlled through a series of suitably configured and intergeared cams. Such medium of control, however, is subject to certain inherent limitations of function and structural defects, chief among which are—the restriction in the rate of travel of the tool due to frictional resistance between the cam and follower; limitations due to vibratory reactions initiated by the alternate engagement of the follower between opposed cam faces; loss of tool travel, incident wear on the cam surfaces; tool chattering due to outboard control arms or the presence of dirt and foreign matter upon the cam faces and the limited selectivity of tool stages consequent the confining proportions of the cam assembly.

In the present invention the movement of the tools is effected through hydrostatic controls, the operation thereof being organized to obviate the foregoing defects and limitations, and to facilitate the more expeditious operation of the machine in its entirety.

The invention is further directed to apparatus adapted to progressively coordinate the actuation of the valves which control the movement of the various tools within the machine.

Another object of the invention is to provide a mechanism for controlling the traverse of the various tool units, the mechanism being adapted to compensatively govern the movement of the tools irrespective of any imposition of variable load that may occur in a single stage of the cycle.

A further object of the invention is to construct a stock feeding device which is coordinated for automatic control with the chuck operating mechanism and which is dependent in operation upon the instrumentalities controlling the movement of the tools.

Another object of the invention is to provide a fluid actuated chuck and stock feeding mechanism which is constructed to effectuate a uniform delivery of the material to the work holding device and organized to prevent accidental movement of the stock during the cutting operation of the tools.

A further object of the invention is to construct a turret operating mechanism which is actuated through a propulsion medium common with the tool actuating controls so as to effect the sequential movement thereof and facilitate ready adjustments in the timed intervals of operation, or modification in the order of the machining events thereof.

A further object of the invention is to provide a mechanism for arresting the inertia of the turret carrier at the completion of the reciprocative translation thereof.

Another object of the invention is to provide an accessible and readily adjustable turret indexing mechanism, the structure thereof being coordinated with mechanism to facilitate a variable rectilinear rate of travel of the turret.

Another object of the invention is to provide a turret indexing mechanism which will effect the progressive advancement of the respective tools within the turret in timed relation with operating burden imposed upon each tool and which will compensatively govern in timed order the sequential movement of the cross slide tools and stock feed device.

A further object of the invention is to construct a turret and cross slide actuating mechanism which is organized to effect the rapid approach of the respective tools into cutting engagement with the work; thereafter to traverse the work at the prerequisite feed cutting rate and upon completion of the machining operation to be rapidly retracted from the work and repositioned for the following operation.

Another object of the invention is to provide a tool feeding mechanism embodying a hydraulic drive, the fluid discharged from such mechanism constituting the control medium for the sequential movement of other fluid driven devices in the machine. In the preferred embodiment herein illustrated the medium of control is effected through cammed gearing associated with a motor, driven by the fluid displaced from the cylinder of the turret upon the actuation of the piston therein. In this structure, while the motor is thus impelled, it rotates the cams operating, in sequence, the control valves which effect the translation of the other tools in the machine, and the stock delivery mechanism, thereby governing the movement of each of these units subsequent the operation of the turret. Although the turret actuating cylinder in the instant case constitutes the master drive, it is to be understood that other of the tool operating cylinders may be substituted therefor as a master control member and that such substitution is contemplated as falling within the scope of this invention.

Other objects and advantages reside in the specific construction and aggroupment of elements peculiar to the structure embodied in the present invention, as will become apparent from a more complete examination of the following specification and appended claims wherein there is assembled and pointed out certain combinations of parts and specific constructions indicative of the scope and spirit of the invention.

In the drawings which illustrate the preferred embodiment of the invention,

Figure 1 is a front elevational view of a screw machine illustrating the arrangement of certain of the parts which are controlled by the hydraulic transmission mechanism incorporated in the improved machine.

Figure 2 is a rear elevational view of the machine illustrated in Figure 1.

Figures 3 and 4 are end elevational views of the machine.

Figure 5 is a vertical sectional view taken on a plane indicated by the line 5—5 in Figure 4.

Figure 6 is a transverse sectional view taken on a plane indicated by the line 6—6 in Figure 5.

Figure 7 is a diagrammatic view of the piping connections between the various units of the machine.

Figure 8 is a diagrammatic view of the fluid circulatory system illustrating the arrangement of parts when the turret tools are approaching the work in rapid traverse, and before the controls regulating the machining feed are engaged. During this event the chuck is closed upon the work and the stock feed mechanism is being prepositioned for stock delivery. The cross slide tool carriers as shown are advancing toward the work.

Figure 9 is a diagram similar to Figure 8 showing the turret and cross slide tools advancing at their respective tool cutting speeds—the chuck is closed, and the stock feed mechanism prepositioned for stock delivery.

In Figure 9 the position of the cross slide tools is assumed as typical of any operative cycle of the machine. It is to be understood, however, that the translation of these tools may occur in any predetermined order with respect to the operation of the turret tools. For example, the machine may be timed to cause the operation of one of the cross slide tool carriers, such as a cut-off tool, at the completion of the operation of the fifth tool in the turret, or one or more cross slide forming tools may be actuated during or intermediate the machining event of any of the turret tool stations.

Figure 10 illustrates, diagrammatically, the tool position after the completion of their respective machining operations and during their initial movement in rapid traverse return. The chuck is about to open whereupon the stock feed mechanism will execute its delivery cycle.

Figure 11 is a diagrammatic view of the parts when the turret is returned coincident the indexing cycle and the cross slide tools are fully retracted. The chuck is open and the stock is being fed therethrough.

Figure 12 diagrammatically illustrates the position of the turrent following the indexing cycle, the turret being herein positioned for rapid traverse toward the work as shown in Figure 8. The stock has been fed and the chuck is closing; the cross slide tool carriers being retracted.

Figure 13 is a front elevational view of the cross slides of the machine.

Figure 14 is a longitudinal sectional view of a portion of the cross slide, the section being taken on a plane indicated by the line 14—14 in Figure 13.

Figure 15 is a transverse sectional view taken on a plane indicated by the line 15—15 in Figure 13.

Figure 16:
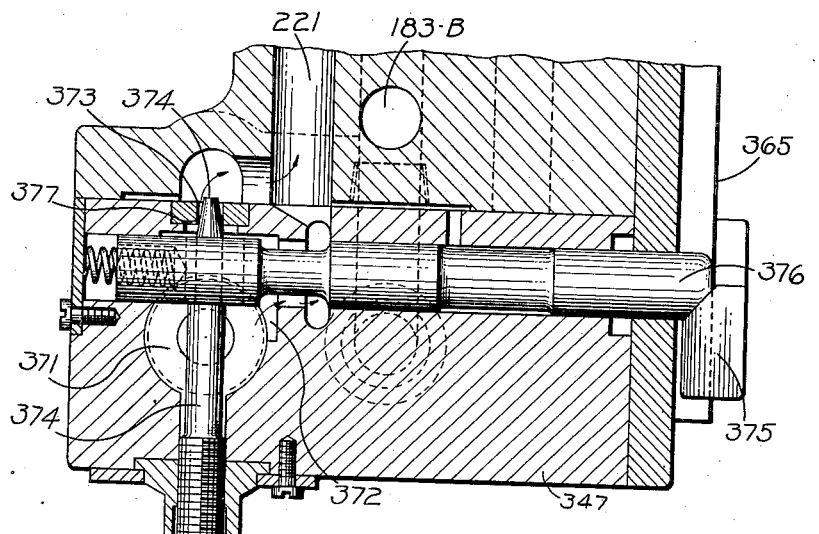

Figure 16 is a lateral section, the plane thereof being indicated by the line 16—16 in Figure 15.

Figure 17 is a horizontal sectional view of the stock feeding mechanism and the chuck, the section being taken on a plane indicated by the line 17—17 in Figure 4.

Figure 18 is a vertical sectional view of the same, including the reversing valve, the section being taken on a plane indicated by the line 18—18 in Figure 17.

Figure 19 is a longitudinal sectional view of the head of the machine illustrating the arrangement of the feeding mechanism, clutch and chucking device, the section being taken on a plane indicated by the line 19—19 in Figure 13.

Figure 20 is a detail view partially in section of the turret reversing pilot valve and the actuating mechanism therefor.

Figure 21 is a detail sectional view of the turret control mechanism, the section being taken on a plane indicated by the line 21—21 in Figure 2.

Figures 22 and 23 are elevational views of the fluid motor for operating the valves controlling the stock feed mechanism and its appurtenances.

Figure 24 is a transverse sectional view through the turret locking device, the section being taken on a plane indicated by the line 24—24 in Figure 2.

Figure 25 is a vertical sectional view illustrating the intergeared organization of the turret head, the stock control and cross slide mechanisms, the section being taken on a plane indicated by the line 25—25 in Figure 2.

Figure 26 is a detail view shown upon an enlarged scale illustrating the index shaft and its appurtenances.

Figure 27 is a vertical sectional view of the turret head, the section being taken on a plane indicated by the line 27—27 in Figure 3.

Figure 28:
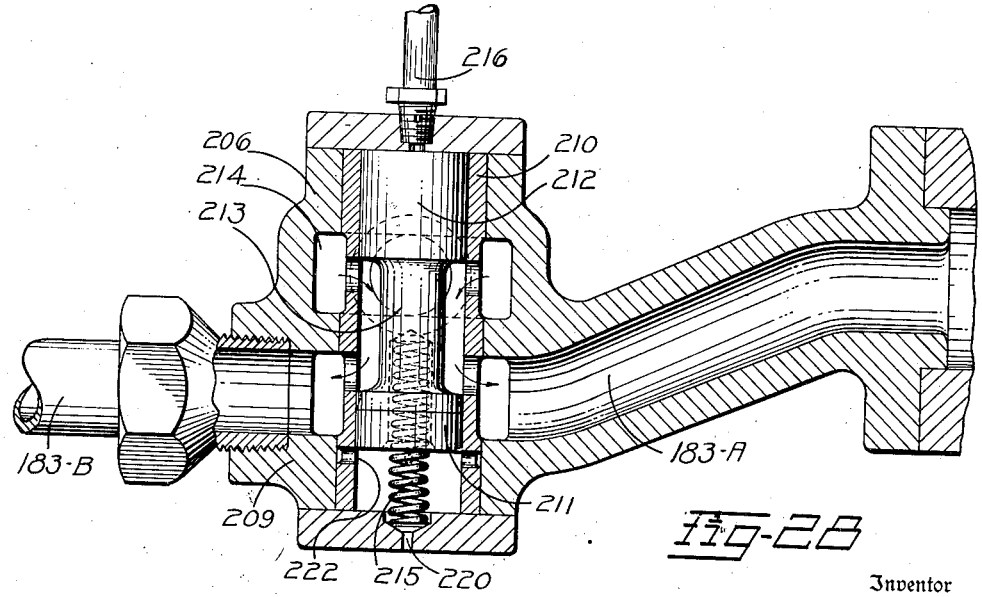

Figure 28 is a vertical sectional view of the pressure relief valve, the section being taken on a plane indicated by the line 28—28 in Figure 5.

Figure 29 is a front elevational view of the stock feed valve operating cams.

Figure 30 is a vertical sectional view through one of the valves, the section being taken on a plane indicated by the line 30—30 in Figure 29.

Figure 31 is a detail plan view of the turret head and the contiguous portions of the machine.

Figure 32 is a detail sectional view of the drum cam, the section being indicated by the line 32—32 in Figure 25.

Figures 33 and 34 are sectional detail views of a valve adapted for manual control of certain of the operating units.

The turret lathe, illustrated in the accompanying drawings, to which reference may now be had for detailed description, comprises the usual base member, turret head, cross slides, work carrying spindle assembly and power transmission mechanism therefor, these parts being so organized that the tools mounted in the turret head and cross slides are brought into operative engagement with the rotating work in any desired sequence.

The base 100 of the machine is of the form generally known as the cabinet type, that is, a hollow pedestal flanged for securement upon the floor and provided, upon the upper face thereof, with a ledge or seat 101 for receiving the bed 102 of the machine. Adjacent the upper portion of the base there is a channular ledge 103 provided to receive the excessive cutting lubricant and waste materials thrown from the tools while the machine is in operation.

The bed of the machine is constructed to support the driving motor 104, the work carrying spindle assembly 105 and the turret support 106. In structural detail the bed casting comprises a substantially rectangular casing formed with an elevated portion adjacent one end thereof which constitutes the turret support. Adjacent the turret support and cast en-block with the machine bed there is a super-frame structure 107 formed to support the turret actuating controls and a cylinder body which receives the turret actuating piston. The interior of the casing 102 is formed with a pair of transversely disposed walls having bosses therein bored to receive anti-friction bearings for the motor drive shaft and paraxially disposed spindle drive counter shafts.

In the present embodiment the work carrying spindle is driven through a gear train operatively connected with the counter shafts and supplemental gearing for power application from the motor. It is to be understood, however, that a hydraulic propulsion mechanism may be substituted for the gear drive shown herein and that such power transmission is contemplated as falling within the purview of the present invention.

With further reference to the structure of the machine bed and the mechanisms borne thereby, it will be seen that the casing is apertured to receive a motor adapter ring 108 which is piloted within a counter-bored seat 109 in the end portion of the casing. The armature shaft 110 of the motor is arranged in coaxial alignment with the drive shaft 113 and is coupled thereto through a sleeve 114 keyed upon the contiguous end portions of each shaft. A spur gear 115, formed upon the sleeve adjacent the outer end thereof is intermeshed with a gear 116 mounted upon the drive shaft of a pump 117. This pump is provided to effect the circulation of the cutting compound or cooling lubricant supplied to the various tools during the operation of the machine and may be of any of the usual types customarily employed for such purposes. The shaft 113 is journalled in anti-friction bearings 118 and is provided with a flexible drive coupling 119 united with the shaft of a hydraulic pump 120 which impels the fluid forming the medium of power transmission for actuating the various tools operating instrumentalities throughout the machine. Adjacent the coupling there is a pinion 121 which is intermeshed with a gear 122 mounted upon a shaft 123 journalled in anti-friction bearings in the wall 112 and in the outer wall of the casing 102. Upon the outer end of the shaft 123 there is a pinion 124 meshed with a spur gear 125 upon the end of a shaft 126 journalled in bearings formed in the casing 102 and walls 111 and 112.

The gear 125 and the pinion 124 extend beyond the outer face of the casing 102 and are shielded by a guard plate 127. Upon the inner end of the shaft 126 there is a gear 128 intermeshed with an idler gear 129 mounted upon a jack shaft 130 journalled in anti-friction bearings within the stock feed casing 105. The gear 129 is meshed with a pinion 131 upon the stock carrying spindle 132. The driven rotative speed of the work carrying spindle 132 may be altered by substituting gears of variable ratios for the gears 124 and 125 which, as will be seen in Figure 3, are readily accessible through the hinged guard plate 127. Access to the pump 117 and gearing therefor may be obtained through an aperture 133 in the bed casing which, as shown in Figures 2 and 4, is enclosed by a cover plate 134 upon the outer face of the bed casing 102.

In the forward face of the casing 102 there is an outwardly protruding filler cup 135 having a pivotally mounted cap 136 thereon. The inner wall of the cup is apertured to provide communication with a reservoir 137 disposed within the base 100. Contiguous the cup there is an apertured boss 138 arranged at a suitable angle to accommodate the support of a fluid level gauge 139 within the reservoir 137.

Upon the forward face of the bed there is a plate 140 supporting a valve mounted for assembly within the casing and having a manually operable shut-off throttle 141 extended therethrough. The plate 140 is arranged to cover an opening 142 in the bed which provides access to the mechanisms associated with the valve and the conduit connections therefor. Adjacent the plate 140 there is a pad or boss 143 machined to support the flanged base 144 of a fluid motor or turbine 145, a portion thereof being disposed to extend through an opening 146 in the wall of the casing 102. The shaft 147 of the motor is journalled in a bearing 148 in the plate 144 and protrudes through a bore 149 in the plate 140 (Figure 21), across the forward face of the machine parallel the longitudinal axis thereof. The outer end of the shaft is journalled in brackets 150 formed in a valve unit assembly 151 mounted upon the bed casing 102.

The valve unit 151 embodies a plurality of discs 152 having adjustable plates 153 thereon arranged for engagement with rocker arms 154, the cammed end portion 155 thereof (Figures 29 and 30) being operatively associated with rollers 156 mounted respectively upon the free ends of a set of shuttle valves 157 housed within the body of the valve unit 151. The casing 102 is formed with a depressed wall area 158 to provide a clearance for the cam discs 152 and contiguous the valve units 151 there is an opening 159 to facilitate the assembly of the feed conduits and valve unit fittings within the bed. Adjacent a concave area 160, formed in the casing 102, there is a cam 161 which is mounted upon the shaft 147 contiguous the plate 140. The cam 161 is coordinated with linkage 162 adapted to effectuate the transfer of the machined stock or work upon completion of the final tooling operation.

In the upper portion of the casing 102 and in juxtaposition with a cylinder within the frame structure 107 there is a transversely disposed opening 163 formed to receive the valve cages 164 and 165 and an intermediate valve cylinder 166 (Figure 6). Above the valve cage 164 and paraxially disposed with the turret slide there is a ledge 167 constituting a tool tray for the convenience of the operator setting up the machine. The ledge is formed with a ribbed face 168 and is provided with a marginal flange or guard wall 169.

The rearward face of the bed is constructed with an outwardly extended body portion 170 having a hand hole 171 therein provided with a removable cover plate 172. The opening 171 facilitates access to the hydraulic pump 173, the regulator valve 174 and the conduit fittings assembled within the bed of the machine. As will be seen in Figure 6 the casing is constructed with enlarged wall sections having conduits cast therein and cored or drilled passages forming the circulatory system for the fluid propelling the various tool actuating mechanisms.

The fluid circulating system

Considering now the hydraulic drive and control mechanisms therefor and with particular reference to Figures 7, 8, 9, 10, 11 and 12, wherein the fluid circulatory conduits are diagrammatically illustrated, the system embodies generally the pressure pump 173, supply lines therefrom to the turret feed, cross slides and stock spindle assemblies, and a fluid return line from the turret feed coordinated with a control valve mechanism to govern the movement of the cross slides and stock feed spindle. More specifically the fluid circulatory system comprehends a pressure fluid artery having two divergent branches, the circulation in one branch thereof being controlled by the fluid discharged from the other under the influence of a turbine motor which is impelled by the fluid in the discharge line or fluid return line so that the movement of all the instrumentalities in one branch conduit is operably dependent upon the actuation of the mechanisms operated by the other branch.

The pump 173 is mounted upon a pedestal 175 supported on a transversely disposed web 176 in the machine base 100 (Figure 6). The pump in the instant case is of the multi-unit type having a section 177 adapted for high volumetric delivery and a section 178 of a lesser output. The pumps are in fluid communication with the reservoir 137 through an inlet pipe 179 having a branched manifold connection with each of the pump sections. The conduits 180 and 181 respectively are connected to the volume regulator unit 174 which is adapted to maintain an operative fluid pressure to each of the hydraulic actuating mechanisms throughout the machine under the varying volumetric demands of such mechanisms and to further by-pass or divert from circulation the excessive fluid displaced by the pump under inoperative events of any or all of the hydraulic driving mechanisms. The regulator 174 comprises a casing formed with a canal 182 communicating with the conduits 180 and 181 and with a return passage. The conduit 180 is coordinated with a by-pass valve 184 which embodies a spring-loaded piston 185, operable under fluid pressure to open a valve 186 seated in a branch of the return passage 187. The valve 186 is held in its seated position by a spring 188 and is opened when the fluid pressure in the canal 182 and a duct 189 therefrom, admitting fluid beneath the piston 185, rise under sufficient circulatory restrictions to overcome the spring 188 and effect the closure of a check valve 190 which is disposed within the canal 182 intermediate the duct 189 and valve 186. The check valve 190 comprises a plate or flap hinged to the upper wall of the canal and is arranged for closure upon its seat in the lower wall of the canal when the fluid pressure in the circulatory system of the machine exceeds the delivery pressure from the pump unit 177. Upon the closure of the check valve 190 and the simultaneous opening of the valve 186 the fluid displaced by the pump 177 flows through the return line 187 to the reservoir 137. Thus, the pump section 177 may be continuously operated and will deliver a relatively large volume of fluid, such as required to operate the rapid transverse pistons, until the volumetric demands of the machine fall when the by-pass valve 186 will open and discharge or return the excessive fluid to the reservoir.

The operating pressure in the delivery line 183 is maintained by the spring load exerted upon a ball check valve 191 coordinated with a relief valve 192 and by-pass unit 193 (Figures 8 and 9). In detail the relief valve comprises a piston 194 having a stem 195 upon the end portion thereof formed to constitute a by-pass valve between the canal 182 and the return line 187. The piston is retained within a cylinder 196 which is in fluid communication with the canal 182 through ducts 197 and 198 communicating respectively with the portions of the cylinder disposed above and below the piston. Intermediate the head of the cylinder and the upper face of the piston there is a contractile spring 199 which urges the closure of the by-pass valve 193. In the head of the cylinder 196 there is a port 200 opening into a chamber 201, the inner wall thereof being formed with a valve seat 202 for the reception of the ball check valve 191. The outer end of the chamber 201 is threaded to receive a screw 203 which is provided to facilitate the adjustment of a variable load upon a spring 204, engaging the ball check valve 191. When the volumetric demand of the hydraulic actuating mechanism is low or entirely arrested a head pressure will be created in the delivery line 183 which will cause the passage of fluid through the ducts 197 and 198 into the cylinder 196. Should the pressure through the duct 198 outweigh the compressive effort of the spring 199 the piston 194 will be raised and the by-pass valve 193 opened to afford the discharge of the fluid delivered through the pump section 178. The by-pass valve 193 is limited, however, in degree of operation by the admission of fluid within the cylinder through the duct 197 as the fluid pressure thereof resists the movement of the piston 194 proportional with the spring load imposed upon the ball check valve 191. Thus, when the spring 204 is outweighed by the fluid pressure within the cylinder the ball check, or pressure balance valve will be lifted and the fluid within the cylinder will be circulated through a vein 205 connected to the return line 187. The movement of the piston 194 and the fluid escapement through the valve 193 is governed through adjustments made upon the screw 203. It will be borne in mind, however, that the pump sections 177 and 178 are continuously operated under constant delivery and that the by-pass valves 193 and 186 are controlled through the biased movement of the check valve 190 when circulation through the delivery circuit is interrupted consequent the closure of the hydraulic actuating mechanism throughout the machine.

The fluid delivery line 183 which leads from the volume regulator 174 is divided into two major arteries, a branch 183a which supplies the turret actuating cylinder and the controls therefor, and a branch 183b which leads to the stock feed, cross slides and their appurtenances. The branch conduits 183a and 183b emanate from a shut-off valve 206 which is provided to relieve the line pressure within the system when the machine is idle. The valve 206 may be manually controlled through suitable linkage from the throttle 141 or as illustrated herein may be operated by a hydraulic ram 207 which is coordinated with one of the valvular units in a feed regulator mechanism 208. The shut-off valve 206 comprises a housing 209 ported to receive the delivery line conduit 183 (Figure 28) which communicates with a cylinder 210 in which a shuttle valve 211 is reciprocatively mounted. The shuttle valve embodies headed portions 212 having an intermediate diametrically reduced body 213, arranged to afford fluid passage between the intake port 214 and the openings leading to the opposed delivery line arteries. The shuttle valve 211 is normally held in its open or in fluid circulating position through a spring 215 disposed within the cylinder for engagement with the lower pilot guiding portion of the valve. The end wall of the cylinder 210 adjacent the intake port is apertured to receive a tube 216 which is connected with the cylinder of the ram 207. The ram is embodied within a cylinder of a fluid regulator mechanism 217 which includes a piston 218 arranged for reciprocative movement upon the manipulation of the throttle lever 141 and a locking cam 219 therefor. The supply of fluid in the cylinder of the ram 207 is provided through the canal 220 which communicates with the return fluid conduit 221. A drain line 222 communicating with the reservoir 137 is positioned in the valve 206 to provide a relief for the delivery arteries 183a and 183b when the shuttle valve 211 is fully depressed and the circulatory system closed as for tooling set-up operations, or similar inoperative events of the machine.

The turret

The turret, actuating mechanism and the control valves therefor are operated by the fluid delivered under pressure through the branch conduit 183a which is disposed for entry within the central portion of the valve cylinder 166, as may be seen in Figure 6. Within the cylinder there is a shuttle valve 223 having a centrally reduced body portion and end sections constituting pistons 224 which are fitted snugly within the walls of the cylinder 166. The shuttle valve 223 is further formed with coaxially extended shanks having pistons 225 thereon which are fitted within cylinders 226a and 226b formed within the valve cages 164 and 165 respectively. These cylinders are in fluid communication through conduits 227 and 228 with a control valve 229 (see Figure 7) which is constructed to effect the passage of fluid under pressure alternately to the cylinders 226 and cause the reciprocation of the shuttle valve 223 within the cylinder. Fluid under pressure from the artery 183a is delivered through a line 230 to the central portion of a chamber within the control valve 229 which is formed by a reduced central portion of the sliding member of the valve core. The end portions of the valve core are disposed with respect to the openings communicating with the conduits 227 and 228 to effect the alternate openings and closure thereof when the valve core is shifted back and forth within the cylinder. Referring again to Figure 6 the piston sections 224 of the shuttle valve 223 are likewise proportioned with respect to the spaced ports 231 and 232 in the cylinder to cause the alternate opening and closure thereof when the shuttle valve is reciprocated.

As diagrammatically illustrated in Figure 8 herein, when the turret is retracted, the shuttle valve is positioned to permit the passage of fluid through the port 231 to the chamber 233, thence to the cylinder 234 adjacent the rearward face of the turret piston 235. While the shuttle valve 223 is thus positioned the core of the control valve 229 is disposed to permit the pressure fluid in the line 230 to circulate through the conduit 227 to the cylinder 226a and thus sustain the shuttle valve setting during the outward movement of the piston. Under the influence of the pressure fluid admitted to the rearward portion of the cylinder the piston 235 will be driven forwardly to the position shown in Figure 9.

Upon the outer end of the piston there is a rod 236 bearing a turret indexing spider 237 and the tool turret head 238 (Figure 27). Supported in the casing 102 there is a shaft 239 having an angulated cam face machined therein disposed for abutment with the forward marginal edge of the indexing spider when the turret is advanced in its most forwardly extended position. Upon the shaft 239 there is a lever arm 240 (Figure 20) which is connected with an extended portion of the valve core of the control valve 229. Upon engagement of the spider with the inclined face of the cam the shaft 239 will be rocked within its bearings thereby causing sufficient rotative movement of the arm 240 to shift the valve core to the position where the port communicating with the conduit 227 will be closed and the port communicating with the line 228 opened, so the pressure fluid will flow to the cylinder 226b thus actuating the shuttle valve 223 and opening the port 231 for the admission of pressure fluid from the conduit 183a to the cylinder 234 adjacent the forward face of the piston, as shown in Figure 10.

At this stage of the cycle the pressure fluid will urge the retraction of the piston 235 and the port 232 now becomes an exhaust opening through which the entrapped fluid will be driven into the return line 221. As the piston is retracted a port 241 in the cylinder 234 will be opened permitting the pressure fluid to flow therethrough to a turbine indexing motor 242 as illustrated in Figure 11. Under the influence of pressure fluid the turbine will be rotatively impelled thereby actuating the mechanism which controls the intermittent rotative movement of the indexing spider 237 and turbine 238.

The turbine 242 is formed with an axially extended shaft 243 (Figures 8 and 25) upon which a pinion 244 is slidably keyed being arranged for longitudinal movement with the indexing spider 237 through a carrier frame 245 mounted upon the shaft 243. The carrier frame 245 is formed with an arm 246 having a notch 247 therein which bridges the pinion 244 and terminates in a facet 248 engaging the face of a gear mounted upon the indexing spider 237. The opposed end of the carrier frame is provided with a lip 249 disposed to abut the end face or forward edge of the indexing spider 237. The engaging portions 248 and 249 of the frame 245 are disposed to effect the longitudinal translation of the frame with the spider during the reciprocative movement thereof although adequate clearance is allowed therebetween to avoid undue frictional resistance during the rotation of the spider. The carrier frame 245 is restrained from rotative movement upon the shaft 243 by an arm 250 having a yoked end which is connected with a pintle 251 mounted in a boss 252 formed in the carrier frame 245. The arm 250 is keyed upon a shaft 253 mounted in bearings within bosses formed in the front and rear walls of the casing 107. Affixed upon the shaft 253 within the casing 102 there is an arm 254 supporting a roller 255 engaged within a tortuous groove 256 formed in a cylinder 257 which is affixed upon the cam shaft 147, as illustrated in Figures 25 and 31. The path of the groove 256 within the perimeter of the cylinder is suitably configured to permit the oscillatory movement of the assembly thereby insuring synchronous reciprocative movement of the turret with the rotative movement of the cam shaft 147.

The rear face of the indexing spider 237 is provided with a gear 258 intermeshed with the pinion 244 and is rotatably driven thereby during the operation of the turret indexing motor. Upon the rear face of the indexing spider there is a series of longitudinally extended pins 259 (Figures 25 and 26) circumferentially spaced relative to each of the tool holders in the turret and allocated for consecutive engagement during the rotation of the spider with the yoked end of an arm 260 mounted upon a shaft 261 journaled in the frame structure 107. Upon the shaft 261 there is a track cam 163 embodying a helical groove 263 merged with paraxial and annular grooves interjoined to form a continuous guideway within which a spring pressed finger 264 is retained. The cycle of the finger through the guide-way 263 constitutes: The forwardly movement thereof through the paraxial groove, the return translation in the helical track and the transaxial movement of the finger as it is guided within the annular groove section of the cam. Near the forward end of the paraxial groove there is a step formed by machining the bottom of the groove to a depth subjacent the level of the remainder of the track. In the operation of this mechanism the finger, when it reaches the end of the lineal groove, will drop into the deeper guide-way, the step or shoulder obstructing the re-entrant movement through the lineal guideway coincident with the entry of the spider upon its return translation in its reciprocative cycle. The helical groove is equal in depth, throughout its length, to that of the lowered portion of the paraxial track. The annular groove, however, is formed with a spiral root or ascending floor which effects the elevation of the finger to the level of the lineal track during the translation of the finger therethrough.

During the return translation of the indexing spider 237 the finger 264 is engaged within the helical groove 263 and upon rectilinear movement of the spider the finger will cause the rotation of the cam and in turn effect the oscillatory movement of the shaft 261. The movement thus imparted to the shaft will cause the opening of a shut-off valve 265 which is disposed within the conduit 266 communicating with the indexing turbine outlet. The shaft 261, however, is held stationary by the finger 264 while it is engaged in the paraxial groove during the forward movement of the frame 245.

Upon the outward translation of the indexing spider the pin 259 of antecedent engagement with the yoke of the arm 260 is longitudinally separated therefrom. The rotation of the cam 262, however, positions the arm 260 to receive the next contiguous pin 259 at the completion of the reciprocative cycle of the indexing spider. Coincident the adjustment of the indexing spider adjacent the inner reciprocative movement thereof the arm 260 is rocked into its former position, the finger 264 at this time following the annular portion of the groove 263 in the track cam 262. As the spider returns from the work and the shaft 261 is oscillated under the influence of the revoluble drive developed by the helical groove 263 and coordinated finger 264, the arm 267 which is keyed upon the shaft 261 is rocked downwardly.

Within the upper portion of the arm 267 there is a pivotally mounted latch 268 which is urged downwardly through the effort of a spring 269 mounted within a bore adjacent the end of the arm. The arm 267 is disposed in contiguous relation with the arm 240 in the upper portion whereof there is provided a plate 270 disposed in the arcuate path of travel of the latch 268. During the downward movement of the arm 267 the forwardly inclined face of the latch 268 will abut the plate 270 causing the compression of the spring and the elevation of the latch until the arm has moved beyond the plate 270. Upon further movement of the shaft 261, in the subsequent cycle, the shaft 261 is oscillated in the opposite direction and the arm 267 then rotated upwardly whereupon the upper face of the latch engages the lower face of the plate 270 and thus returns the arm 240 to its former position and effectuates the readjustment of the valve core of the control valve 229.

Such adjustment of the valve causes the reversal of the fluid circulation and allows the admission of pressure fluid into the passage 227 thereby completing the operating cycle. Coincident with the movement of the lever arm 267 the shut-off valve 265 is closed and thus arrests the passage of fluid through the turbine and prevents the rotative movement thereof. Upon the outer end of the shaft 261 there is a cam operably engageable with a rocker arm which controls a spring pressed plunger 271 configured for engagement within grooves 272 formed in the tool turret head 238. Upon the oscillatory movement of the shaft 261 the plunger 271 is disengaged from the groove to permit the rotative indexing cycle of the turret (see Figure 24). As the retraction of the plunger occurs during the return movement of the turret, the turret head is rotatively released only while the cutting tools are disengaged and moving from the work. With the return rotatable movement of the shaft, during the indexing period, the plunger reenters the next adjacent groove 272 thus securing the turret against rotative movement as the turret is advanced toward the work and held for engagement therewith.

Upon the outer end of the shaft 261 there is a manually controlled valve 273 provided to accommodate manipulation of the indexing mechanism during tool set up and adjusting operations. The valve 273 is provided with a hand lever 274 which is connected to a rotatable core 275 of the valve. The housing member of the valve 273 is formed with a pair of opposed orifices 276 (Figure 9) which communicate with conduits 277 and 278 leading respectively to the intake and exhaust passages of the indexing motor 242. As the valve core is oscillated the pressure fluid bypasses to the indexing motor and allows the manual actuation of the turret.

The control valve 229 (Figure 9) is provided with drainage canals 279 disposed adjacent the opposed ends of the slidable valve element and provided to permit the escapement of the entrapped fluid in the valve chamber upon the actuation of the lever arm 240 and consequent reciprocation of the valve element. The canals 279 communicate with a common return line 280 which leads to the reservoir 137.

The piston 235 is cushioned adjacent the end of its inner and outward stroke by the restriction of the fluid passage through the needle valves 281*a* and 281*b* (Figure 6) disposed in the head of the turret frame 107 and readily accessible from the exterior of the machine. When the piston 235 approaches its innermost position the fluid remaining in the cylinder 234 and the chamber 282 is entrapped therein and communication with the chamber 233*a* is then effected through the needle valve 281*a* and the chambers 263*b* and 273*b*. The pressure fluid, however, will thereafter be admitted (Figures 6 and 11) through the canal 273*a* wherein there is provided a spring loaded poppet valve 284*b* readily operable under the influence of the fluid pressure to admit fluid to the rear face of the cylinder 234. Likewise the canal 273*b* is provided with a secondary passage 263*b* having a spring loaded valve 284*a* therein arranged to permit the passage of fluid thereby to the extreme end of the opposed portion of the cylinder and thus effect the initial movement of the piston, the fluid in the cylinder 234 in the rear of the piston and within the chamber 233*b* being trapped and forced past the restricted needle valve passage 281*b* thus cushioning the return movement of the turret.

The valve casings 164 and 165 are constructed with externally accessible needle valves 285 and 286 which may be set to restrict the flow of fluid from the cylinders 226. The passages communicating with the cylinders and with the conduits 227 and 228 are provided with spring loaded check valves 287 which allow the free passage of fluid from the lines 227 and 228 respectively to the cylinders 226 but prevents the return flow thereof from the cylinders 226 except through needle valves 285 and 286. The action of this valvular control is similar to that of the valves 281 which cushions the movement of the turret.

Sudden movement of the turret in its outward travel is restrained by a spring 288 (Figure 27) interposed between a stanchion 289 formed in the machine casing and a cylindrical guide 290 disposed within the indexing spider 237 and formed integral therewith. The guide 290 is retained against an abutting shoulder 291 in the rod 236 and is retained thereon by a pin 292 which locks a hub portion of the guide with the rod. Adjacent the outer end of the cylinder 234 there is a cap 293 bored to receive a plunger 294 extended from the piston 235. The bore within the cap 293 is sealed by a plug 295 forming a closed cylinder within which there are vents 296 and 297 spaced from the end of the plug so that the air admitted between the plunger and the end of the cylinder will be compressed and thereby snub the movement of the piston at the end of its return stroke.

In the instant case the tools carried by the turret are rotatably driven being supported in spindles 298 mounted in anti-friction bearings 299 within the turret head. The spindles 298 are preferably constructed with a sliding transmission gear mechanism 300 which embodies a plurality of gears of variable pitch diameters adapted for operative engagement with companion gears 301 keyed to a master gear 302 rotatable upon the shaft 236. The gear 302 is intermeshed with a pinion 303 having wide-faced teeth to permit the sliding engagement of the gear and pinion throughout the reciprocative movement of the turret. The pinion 303 is journalled in anti-friction bearings 304 mounted upon a stub arbor 305 retained within a bossed body portion of the turret carriage 106 and driven by a gear 306 keyed to the shaft 126. The transmission gearing 300 and 301 facilitates the use of different types of cutting tools within the respective spindles which may require variable rotative driving speeds. For instance, one of the spindles may be locked against rotative movement to hold the tool in stationary position against work or should it be desired to use a tool requiring a high rotative speed, suitable gear combinations may be selected to effect the proper revoluble drive for such a tool.

The turret head 238 is guided in the turret carriage 106 which embodies an arcuate seat having a semi-cylindrical cap 307 bolted thereon through flanged ledges formed in the marginal edge of the cap. The plunger 271, as will be seen in Figure 24, is guided in a sleeve 308 mounted in the turret carriage frame at a suitable angle to effect the radial engagement of the plunger within the longitudinal grooves 272 formed in the periphery of the turret.

The sleeve 308 is machined with a slotted opening in the central portion thereof to admit the end of the rocker arm 309 which engages a recess 310 in the body of the plunger. The arm 309 is pivotally mounted upon the housing of the control valve 273 and is disposed in relation to the indexing shaft 261 for operative engagement of the cam 311 with a roller 312 supported upon the rocker arm 309. Within the lower portion of the sleeve 308 there is a spring 313 compressively engaged between the end of the plunger and a plug 314 in the end of the sleeve. A cam, similar in form to the cam 311 and connected to a hand control lever 274, is provided to accommodate the manipulation of the plunger 271 when it is desired to release the turret latch in making tool adjustments or during tool set up operations. Upon the inner face of the hand control cam there is a pin 316 which supports a spring pressed plunger 317 sustained within the casing 318 of the valve housing 273 mounted upon the turret head 106. As the shaft 261 is oscillated the cam 311 rocks the arm 309 upon its pivotal connection and in turn effects the reciprocative movement of the plunger thus intermittently locking and releasing the turret head in the sequence of the operative cycle.

*Hydraulic transmission controls*

The rectilinear rate of travel of the turret and adjustments therefor are facilitated through the feed regulator mechanisms 208 (Figure 21) operable through linkage governed by adjustable lugs 319 mounted upon the indexing spider 237. The lugs are longitudinally adjustable in grooves 320 (Figure 27) paraxially disposed in the perimeter of the indexing spider. Within each of the lugs there is a crowned pin 321 which is radially adjustable with the spider through its threaded support in the lug within which it is mounted. The rearwardly adjusted position of the lugs 319 permits the forward translation of the turret to a point where the valve rail 322 is engaged and thereafter the rate of travel is dependent upon the radial adjustment of the pins 321 and the consequent degree of movement or depression of the valve rail. As illustrated in Figure 21, the valve rail is pivotally mounted upon the valve housing 208 and is constructed to support a toggle linkage 323 having a bell crank 324 formed upon one of the lower link members. The free end of the bell crank 324 is engaged by the yoked end of a pivotally supported lever 325 which is constructed with a lip 326 adjacent the free end thereof and a depending arm 327 which supports a pintle 328. The lip 326 is disposed for engagement with a dog 329 mounted upon a cam plate 330 rotatably driven by the cam shaft 147. The pintle 328 is engageable with a lug 331 in the cam, the lug being configured with an angulated face, which, during the rotation of the cam, rides over the pintle and effects the oscillatory movement of the lever arm 325. The lower portion of the toggle 323 is secured to an arm 332 formed with a yoked end engageable with the stem 333 of a valve member 334. The arm 332 is fulcrumed to the casing 208 at a point to effect the suitable travel of the valve core upon actuation of the valve rail 322. As the fluid expelled from the cylinder 234 (Figure 10) passes through the return line 221 the turbine 145 will be impelled causing the rotation of the cam shaft 147. As the cam plate 330 is thereby rotated it will cause the dog 329 (Figure 21) to engage and over-ride the lip 326 which rocks the lever arm about its fulcrum, depresses the bell crank 324 and thus breaks the toggle 323. Under the influence of a spring 335 within the valve casing the plunger of the valve member 334 will now assume its extended position. While the valve 334 is thus lifted the fluid ejected from the turbine 145 will by-pass a balance valve 336 formed in the valve unit 208, as illustrated in Figures 7 to 12, inclusive, and Figure 21, and will flow past a necked portion 337 (Figure 12) of the valve to a canal 338 which is united with the return line 339 within a veined portion of the valve casing 208 provided the shut-off valve piston 218 is positioned to permit fluid passage by the reduced section 340 therein.

While the toggle is broken and the circulation of the return fluid past the valve 334 (Figure 12) is unrestricted the fluid displaced from the cylinder 234 is free for ready escapement through the return conduit system thereby effectuating the rapid return of the piston and turret. As the cam plate 330 revolves further in the cycle the lugs 331 (Figure 21) will engage the pintle 328 and the inclined face thereof will ride over the pin drawing the free end of the lever arm 325 downwardly thereby adjusting the bell crank 324 to straighten the toggle arm while the toggle arms are in their aligned position to sustain the thrust imposed thereon. Through the movement of the rail 322 the lever 332, and in turn the valve plunger 333, are depressed. The degree of travel of the valve plunger 333 is governed by the radial adjustment of the pin 321 which engages the valve rail 322 during this event. When the lugs 319 are positioned to be free of engagement with the valve rail 322 adjacent the initial movement of the turret, the valve plunger 334 is then unrestrained and extended to effect the rapid traverse of the turret. When, however, the lugs are positioned for engagement with the rail, either through adjustment or consequent the forward travel of the turret, the contacting pins 321 engage the rail 322 and depress the valve stem 334, arresting the rapid translation and throwing the turret into the prerequisite tool cutting feed. The toggle links during this cycle are in their aligned relation and remain so adjusted until the tools are through cutting when the toggle is broken by the dog 329 and the plunger again released for rapid return traverse. The lug or dog 331 is so disposed on the cam plate 330 that the toggle 323 is closed at the same time the turret indexing event occurs. While the plunger is depressed and the passageway 338 closed the fluid is forced through an opening 341 surrounding the stem of the valve 336 which is formed with a variable orifice, the adjustment thereof automatically controlling the flow of fluid therethrough. From this passage the fluid flows through a vein 342 into a chamber 343 adjacent a necked portion 344 of the plunger 334. The portion of the plunger 334 above the necked portion 344 thereon is formed to converge slightly so as to effect a gradual closure of the annular groove 345 within the cylinder body of the valve when the plunger is depressed. Thus, when fluid is admitted in the chamber circumambient the necked portion 344 of the valve, it will escape to the return passage 338 at a displacement rate proportional to the restriction caused by the elevation of the tapered portion of the valve plunger 334. The piston 218, constituting the shut-off valve, is formed with necked sections 340 adjacent the opposed ends thereof. These sections are normally disposed to facilitate the passage of fluid about annular grooves in the body of the valve which communicate with a common outlet connected with the return line 346. The uppermost passageway forms the canal which drains the fluid from the turret while the lower passage, shown in Figures 7 to 12 inclusive, constitutes the canal which accommodates the drainage of the fluid from the cross slide and work spindle mechanisms.

Cross slides

The branch artery 183b supplies the pressure fluid to the cross slide tool supports 347, which in the instant case, are associated with the head of the machine 105 embracing the work spindle. As shown in Figure 13 the cross slide unit embodies three tool supporting members, which are disposed in radial relation with respect to the spindle. It is to be understood, however, that various modifications in the disposition and arrangement of the slides may be resorted to without departing from the spirit of the present invention. For instance, the cross slides may be diametrically opposed or may be mounted upon ways supported by the bed of the machine, arranged for trans-axial movement to and from the work in the manner in which cut-off tools are customarily arranged.

The actuation of each of the cross slides is governed through a valve unit 151 which comprises a cylinder having a reciprocatively operable shuttle valve 157 mounted therein urged outwardly by a spring 348 interposed between the inner end of the shuttle valve and the end wall of the cylinder (see Figures 29 and 30). The central portion of the shuttle valve 157 is reduced to provide a chamber 349 of sufficient length to encompass the ports 350 and 351 which communicate respectively with the line 352 leading to the pressure fluid artery 183b and the lines 353 and 354 which are connected to a master valve 355. During the operation of the turbine 145 and the consequent rotation of the cam shaft 147 the fingers 153 mounted upon the cam plate 152 will intermittently engage the rocker arms 154 and cause the shuttle valve 157 to be shifted, as shown in Figure 10, to close the port communicating with the conduit 354 and open the port connected to the conduit 353 which leads to the opposite end of the plunger 356 of the master valve 355. When the central portion of the valve 157 is positioned to afford fluid communication from the pressure fluid passage 352 through the conduit 354 (Figures 8 and 9) the port communicating with the conduit 353 will be open for communication with a reduced portion 357 of the shuttle valve 157 which is arranged for fluid communication with a return line 358 manifolded with the conduit 221. In this cycle of operation the pressure fluid is alternately admitted to the opposed ends of the valve plunger thereby reciprocatively shifting the plunger to open and close the port 359 (Figure 15) adjacent the rear face of the cross slide actuating piston 360 and the port 361 disposed at the forward end of the cylinder 362 within which the piston 360 is reciprocated.

The piston 360 is formed with a shank 363 extended beyond the cylinder 362, the end portion thereof being necked for engagement with a boss 364 upon the tool slide 365 which tracks inways of the usual form. The outer face of the tool slide is formed with the conventional T-slot to accommodate the support of the cutting tool or fixture mounted thereon. The rearward portion of the tool slide embodies an adjustable stop 366 adapted to restrict the rectilinear movement of the slides during the reciprocative movement thereof. The inner end of the piston is formed with a bore 367 disposed for coaxial alignment with a conical plug 368. The re-entrant engagement of the tapered plug within the bore 367 gradually displaces the fluid as the plug enters the bore. Thus, the cushioning of the piston is effected adjacent the end of the return stroke thereof.

While the tool is advancing toward the work the valve plunger 356 is positioned to permit the passage of fluid from the forward end of the piston through the vein 359 and into the chamber 369 from which it is expelled through an opening restricted by a poppet valve 370 within a cavity 371. The cavity 371 is provided with an outlet 372 communicating with the return passage 221, also a secondary passage 373 (Figure 16) of lesser magnitude which is restricted by a needle valve 374 constructed for adjustably restraining the ready egress of the fluid from the chamber, thereby snubbing the forward movement of the piston.

Under the influence of a cam block 375 supported upon the slide 365 the inner end of a plunger 376 will close fluid communication from the chamber 371 with the passage 221. Such closure is effected by the reciprocative movement of the plunger 376 which is spring urged outwardly from the bore within which it is mounted, and the engagement of the outer end of the plunger with an inclined surface upon the face of the cam block 375. The fluid in the cavity 371 may also flow, during this cycle, through a canal 377 which communicates with a chamber 378 having a reciprocable piston 379 mounted thereon (see Figure 15). The fluid expelled through the passage 369 is sustained under a pressure initiated through a spring 380 within the piston 379 which induces a constant expellent pressure within the passage 369, thus compensating for any differential line pressure loss that may occur throughout the cycle. When the plunger 356 is positioned to expel the fluid through the port 361 the necked portion thereof permits fluid escapement through a passage 381 which communicates with a chamber 382 provided with an opening 383 therein communicating with the return line 221.

The chamber 382 is also formed with a vein 384 which opens into the cylinder 378 to stabilize the reciprocative movement of the piston 379.

Stock feed and chuck controls

In the present embodiment the work or stock to be machined is supported in the tubular spindle 132 which is rotatively driven through the pinion 131 and the gear train associated therewith, as illustrated in Figures 5 and 19, heretofore described.

The stock holding mechanism or chuck assembly embodies a sleeve 385 mounted within the spindle 132 and reciprocatively movable therein through the yoke and bell crank structure of the type customarily employed in similar machines. The bell cranks 386 are pivotally supported within ears 387 formed in a collar adjustably mounted upon the periphery of the spindle 132. The inner ends of the bell cranks extend through slotted apertures 388 in the spindle and are disposed for abutting engagement with the end of the sleeve 385. The outer ends of the bell cranks 386 are adapted for engagement by a collar 389 slidably mounted upon the spindle and reciprocatively controlled thereon through a yoke 390 borne by a rod 391 mounted upon the actuating piston 392, as shown in Figure 17. The piston 392 is reciprocatively mounted within a cylinder 393 formed in the casing 105 which houses the stock feed mechanism and control members therefor. Pressure fluid is admitted to the cylinder 393 through a canal 394 which is connected to a valve chamber 395 having a shuttle valve 396 reciprocatively mounted therein (Fig. 18). The shuttle valve is formed with a centrally reduced portion 397, the outer ends thereof constituting piston sections 398. The chamber 395 intermediate the piston sections 398 is supplied with pressure fluid through a vein 399 which is in fluid communication with the artery 183b. The opposed ends of the shuttle valve 396 are provided with pilot pistons reciprocatively mounted in cylinders 400 and 401 respectively. The former cylinder is in fluid communication through a conduit 402 with a port 403 within the valve unit 151. The cylinder 401 is similarly organized for fluid communication with the valve 151 through a conduit 404 connected with a port 405 in the valve unit (see Figure 8). The valve unit 151, as heretofore described, embodies a slidable core reciprocatively controlled by the rocker arm 154, actuated through cams 152 mounted on the cam shaft 147. The valve 151 is supplied with pressure fluid through a delivery conduit 406 communicating with the artery 183b. Upon reciprocative movement of the valve core or plunger 157 the pressure fluid is alternately admitted from the line 406 to the conduits 402 and 404 to the cylinders 400 and 401 thereby effectuating the reciprocative movement of the shuttle valve 396. When the fluid is admitted to the cylinder 400, as illustrated in Figure 8, the piston 392 is sustained in the position which controls the closure of the chuck, that is, the rod 391 is positioned to effect the engagement of the collar 389 with the bell cranks 386, thus causing the translation of the sleeve 385 against the end of a collet casing 407 and urging the same outwardly. As seen in Figure 19 the rectilinear movement of the casing 407 thus effected, impinges the conical periphery of the spring collet fingers 408 within a tapered seat in the casing 407 thereby compressively closing the collet and effectuating the frictional securement of the stock thereon.

Tran..position or the reversal of the valve core 151 when operated by the control cam 152 causes the pressure fluid to flow through the conduit 404, the conduit 402 now receiving the fluid expelled from the cylinder 400, as illustrated in Figure 11. Consequent the latter adjustment the shuttle valve 396 is shifted to admit fluid through a canal 409 which is disposed in the end of the cylinder adjacent the outer end of the machine. Upon the admission of the fluid in this portion of the cylinder the piston 392 will be retracted to open a vain 410 which communicates with a cylinder 411 provided to retain a piston 412 which controls longitudinal movement of a rod 413 having a yoked arm 414 thereon operatively engageable with a collar 415 mounted upon the spindle 132. As pressure fluid is admitted to the opposite end of the cylinder 411 through the canal 416, as illustrated in Figure 8, the piston 412 is translated rearwardly with respect to the work thus retracting the collar 415. The collar is formed with ears 417 extending inwardly through slotted portions of the sleeve and through apertures 418 within a tube 419, the end portion thereof being kerfed to form spring fingers 420 compressively engaging the work or bar stock.

The position of the passage 416 is allocated in the cylinder 393 so that the outward reciprocation of the piston 412 occurs only during the interval when the piston 392 is in its extended position and holding the collet in locked engagement upon the stock. Thus, the spring clutch fingers 420 will be retractively drawn over the stock while the collet is closed and the work is locked against lateral movement. The passage 410 is positioned in the cylinder 393 to admit pressure fluid to the outer face of the piston 412 when the piston 392 is in its retracted position or at the interval when the chuck jaws are open. Thus, upon the inward movement of the piston 412 and in turn the translation of the collar 415 toward the collet the spring clutch 420 will eject the stock through the mouth of the collet 408, the length of the stock thus fed depending upon the pre-adjustment of the stop screw 421, as illustrated in Figure 17.

The piston 412 is bored for the reception of a plug 422 having inwardly convergent grooves 423 therein, the reentrant engagement thereof effectuating the gradual displacement of fluid within the bore thus cushioning the piston adjacent the inward reciprocative stroke thereof. The piston 392 is similar in structure having a plug 424 with a tapered groove therein which cushions the piston adjacent the end of its return stroke. The outer end of the shaft 391 is provided with a guide rod 425, the enlarged end portion thereof being engageable, adjacent its outward stroke, with a rubber buffer plate 426 which arrests the shock upon the outward reciprocative travel of the rod.

As illustrated in Figure 8 the canal 416 supplies the cylinder 411 with pressure fluid and upon reciprocation of the piston 412 this passage constitutes the return outlet, as shown in Figure 11. The canal 416 is intercepted intermediate its ends with a branch vein 427 having a by-pass valve 428 therein which is adapted to admit pressure fluid therethrough under a pressure exceeding a predetermined load imposed upon the spring in a second valve 429 disposed within the vein 427. The valves 428 and 429 are of the spring closed type and are provided with adjusting screws for varying the load upon the respective valve seats. By adjusting the spring load upon the valve seat 429 in the return line to resist the expulsion of the fluid from the cylinder 411 and by setting the by-pass valve 428 so that it will but slightly outbalance the fluid pressure in the return line a relatively low effective pressure is obtained within the cylinder 411. The pressure restrictions thus provided prevents the sudden movement of the piston upon admission of pressure fluid within the cylinder and thereby avoids escapement or slippage between the spring clutch 420 and the stock during the stock feeding event. The cylinder 411 is drained through the canal 410 during the outward reciprocation of the piston 412 through a by-pass vein 430 in which there is a spring loaded by-pass valve 431 operable under the fluid circulation to convey the return fluid through ports in the cylinder 393 and from thence through the exhaust passage 432 to the return conduit 221.

*Operation*

The fluid in the supply reservoir 137 is continuously drawn through the pump sections 177 and 178 and delivered under pressure to the circulatory system of the machines. During certain operative cycles of the machine the volumetric demands of the tool actuating mechanisms fall below the output of the pump sections 177 and 178 at which time a back pressure is effected in the delivery lines 183a and b which causes the operation of the volume regulator 174 and the return of the fluid to the reservoir 137. As shown in Figure 9, when the motor 104 is operated but the shut-off valve 141 is closed, as illustrated in Figure 7, fluid is circulated through the pump sections to the regulator valve 174 where the pressure responsive mechanisms therein cause its return to the reservoir. When the valve 141 is open, as during the operative cycle of the machine, fluid under pressure is conveyed through the artery 183a to the turret operating mechanisms and to the various control units. Thereupon the turret is reciprocated, the pressure fluid effecting the driving medium and constituting the means of control for the mechanisms of sequental operation. As herein disclosed the apparatus adapted for responsive control to the return fluid circulation embodies a turbine motor impelled by the discharge fluid and in operable synchronism with the turret indexing mechanism. Rotation of the turbine drives a shaft having a series of cams thereon which operate valves controlling the movement of hydraulic plungers which advance and retract the cross slide tools and progressively operate the chuck and the stock feed mechanisms.

Volumetric delivery to the various actuating mechanisms may be varied either at the source or in connection with one of the tool operating units. However, adjustment in any of the tool units does not impair the sequence of operation of the coordinated tool mechanisms, since the discharge fluid in the turbine or whichsoever unit is chosen as the master control set governs the operation of the other tools. Moreover, any diminution in the operative speed of a single unit, such for instance as occurs when a certain tool is subject to an over-burden, does not impair the progressive operation of the tools within the cycle.

The indexing mechanism as heretofore defined, facilitates a range of adjustability in the feed rate so that tools of variable cutting depth may be employed without modification in the driving speed of the machine in its entirety. For example, the feed may be set to accommodate a deep bore wherein the rotative drive of the spindle and the translation of the tool must be coordinated. In the machine constituting the present invention adjustments may be made in the spindle transmission gearing, the control valve and the indexing spider to accommodate any one of the tool spindles to such service while adjacent tool stages may be set for high rotative drive and rapid feeding engagement without structural modification in the machine or the necessity of reconstruction to adapt any of the tool stages for different types of service. The tools are advanced and retracted in rapid traverse with respect to the work thereby minimizing the floor to floor time per unit. The cross feed tools and/or any tool stations in the turret may be independently adjusted for inoperative mobility within the cycle and when such adjustments are made no time loss is occasioned thereby other than the slight time interval of rotation of the cam shaft or index spider from one trip plate to the next concomitant the tooling set up.

In addition to the advantage of constant pressure application upon the tool, which obviates the deleterious effects of vibration the present invention anticipates further elimination of vibratory reactions throughout the machine by the provision of the shock arresting mechanisms disposed in the actuating cylinders adjacent the ends of the piston stroke. In the instant case the inertia forces of the pistons are arrested by self contained hydraulic rams organized to gradually restrict the fluid ejected from the cylinder of the ram structure. It is obvious, however, that valvular expedients effecting a similar result may be employed and it is therefore to be understood that such mechanisms are contemplated as falling within the scope of the present invention.

The turbine cam shaft 147 controlling the operation of the valve units 151 embodies a plurality of cam plates which are preferably constructed with actuating trip lugs or dogs thereon for coordination with the valve rocker arms and the reciprocative valve plunger. This organization facilitates a wide latitude of adjustability to accommodate modification in the turret controlled opening or closure of the valves and the consequent operation of the tool actuating mechanisms governed thereby. It is recognized that the specific structure disclosed herein is susceptible to modification either with respect to the arrangement of the adjusting plates or in the driving medium per se and it is accordingly understood that such actuating mechanisms as are impelled by the circulation of the return fluid are deemed within the scope and spirit of this invention.

In the present embodiment a single work holding spindle has been illustrated and described, it being understood, however, that the invention contemplates the application of a hydraulic driving medium for the work holding spindle and for a plurality of such spindles arranged for rotative adjustment with respect to the turret tools. Moreover, the invention anticipates an indexing mechanism organized for application with the rotatable spindles and with means for effecting the sequental order of operation of the various tool members within its function. In further detail of a mechanism of such character, the work holding spindles may be mounted within a revoluble head or cylinder wherein a plurality of stock delivery and chucking units are assembled which are controlled from a fluid operated actuating mechanism common with the work holding spindles and intermittently positioned for operation by an organization of mechanisms similar in structure to the apparatus heretofore described.

Although the foregoing description is necessarily of a detailed character, in order that the invention may be completely set forth, it is to be understood that the specific terminology is not intended to be restrictive or confining, and that various arrangements of parts and modifications of structural detail may be resorted to without departing from the scope or spirit of the invention as herein claimed.

I claim:

1. A lathe comprising a rotary work holder having a chuck, fluid operated chuck opening and closing means, a fluid operated stock feeding device, a fluid operated turret and mechanism operated by the fluid ejected from said fluid operated turret for controlling the actuation of the said chuck operating means and said stock feeding device.

2. An automatic turret lathe having a rotary work holder, a tool turret, fluid operated means for operating said turret, fluid operated cross slide tool carriers, fluid operated stock feed and chucking mechanism, a turbine operably controlled by the said means for operating the turret, and means operable by said turbine for controlling the actuation of the said cross slide tool carriers and said stock feed and chucking mechanisms.

3. A lathe having a tool turret, a fluid operated device for reciprocating the same, a cross slide, a fluid operated device for reciprocating the same, mechanism operated by the fluid ejected from the turret reciprocating device, a cam shaft rotatably driven by said mechanism, and means associated with said cam shaft for controlling the actuation of said device for reciprocating said cross slide.

4. An automatic hydraulic screw machine comprising a bed, a tool turret, fluid operated means for reciprocating said turret, a fluid operated turbine for rotating said turret and controlled by said reciprocating means and mechanism associated with said turret rotating means for intermittently arresting the rotative drive thereof.

5. An automatic hydraulic screw machine comprising a bed, a rotatable work holder, a tool turret, a cylinder, a piston reciprocable therein, operative connections between the said piston and turret for reciprocating the turret towards and from the work, a turbine rotatably driven by the fluid expelled from said cylinder upon reciprocative movement thereof, a shaft rotatably driven by said turbine, cams on said shaft, valves operable by the cams, supplemental tool carriers, fluid operated mechanisms controlling the movement thereof and valvular means associated with said supplemental tool carriers operably controlled by said cam operated valves.

6. An automatic hydraulic screw machine comprising a bed, a tool turret, a fluid operated device for effecting the reciprocation of said turret, fluid operated cross slide tool carrier, a valve therefor, a fluid operated chucking mechanism, a valve therefor, fluid operated stock feeding mechanism, a valve therefor, a conduit communicating with the turret actuating device for receiving the fluid ejected therefrom in said conduit and means operable by the circulation of the fluid through said conduit for operating the said valves associated with said cross slide tool carrier, chuck and stock feeding mechanisms upon the said valve.

7. A lathe comprising a bed, a tool turret, a fluid operated device for reciprocating said turret, a fluid operated device for effecting the rotation of said turret, a cross slide tool carrier, a rotatable work holder, a fluid operated chuck therefor, fluid operated stock feed device associated with said work holder, and means associated with said tool turret reciprocating device and controlled by the fluid discharged therefrom for effecting the sequental operation of the cross slide tool carrier, the chuck and stock feed mechanisms.

8. A lathe comprising a bed, a tool turret, fluid operated device for reciprocating said turret, a turbine rotatively driven by the fluid expelled from said turret fluid operated mechanisms, a fluid operated cross slide tool carrier, and mechanism disposed intermediate said turret rotative driving mechanism and said turbine to effect the synchronized operation thereof.

9. A lathe comprising a rotatable work holder, a turret, a pump, fluid actuated mechanism in operative communication with said pump for reciprocating said turret, a cross slide fluid actuated mechanism in operative communication with said pump for reciprocating said cross slide and a cam rotatively driven by the fluid expelled from the turret reciprocating mechanism, a valve operatively associated with said cam and valve for controlling the fluid from said pump for reciprocating said cross slides.

10. A hydraulic lathe comprising a bed, a tool turret, a cylinder, a piston reciprocable therein, said piston operatively connected with said turret, a valve for controlling the admission and ejection of fluid to said cylinder, a cross slide tool carrier, a second cylinder, a piston therein, said piston operatively connected with said cross slide tool carrier, a valve for controlling admission and ejection of fluid in said cylinder, and a cam operatively driven by the fluid ejected from one of the aforesaid cylinders to control the admission of fluid under pressure to the other cylinder.

11. An automatic hydraulic lathe comprising a bed, a tool turret, fluid operated means for reciprocating said turret, mechanism rotatively driven by the turret reciprocating means, a valve for controlling the reciprocative movement of said fluid operating means and a supplemental valve actuated by the mechanism for rotatively driving the turret reciprocating means for automatically controlling the actuation of the first named valve.

12. An automatic hydraulic screw machine comprising a bed, a rotatable work holder, a tool turret, a plurality of rotatably driven spindles therein, fluid operating means for reciprocating said turret, means actuated by the fluid expelled from the fluid operated reciprocating means for coaxially aligning one of the said spindles with said work holder upon each reciprocative movement of said turret.

13. An automatic lathe comprising a bed, a fluid operated tool turret, fluid operated reciprocating mechanism therefor, fluid operated tool carriers, a fluid pump, conduits from said pump to said tool turret, conduits from said fluid pump to said tool carriers, conduit connections between said turret and said tool carriers, means coordinated with the last named conduit and operable by the fluid discharged from the turret to vary the reciprocative rate of travel thereof and means controlled by the flow of discharge fluid from said turret and governed by the said means to vary the rate of travel of the turret for controlling the actuation of said tool carrier.

14. A lathe comprising a bed, a cylinder, fluid connections thereto, a piston reciprocable therein, an indexable tool turret supported thereby, an indexing spider movable therewith, cams adjustably mounted on said spider, a discharge conduit from said cylinder, a valve therein adapted to variably restrict the flow of fluid therethrough, and mechanism coordinated with said cams and operatively connected with said valve whereby the discharge fluid from said cylinder will govern the rate of travel of said turret.

15. A lathe comprising a bed, a tool turret, fluid operated device for reciprocating said tool turret, a fluid operating device for rotating said tool turret, a valve for controlling said reciprocating device, a shaft, a cam mounted thereon and adapted to effect the oscillation of said shaft, operative connection between said cam and said turret, a valve operated by said shaft for controlling said rotary device and linkage coordinated with said shaft to operate said valve for said reciprocating device.

16. In an automatic hydraulic machine, a rotatable work holding spindle, a tool turret, fluid operated device for reciprocating said turret, fluid operated device for rotatively indexing said turret, a plurality of rotatable tool holding spindles in said tool turret, cams movable with said turret and coordinated respectively with each of said turret spindles, a conduit in communication with said fluid operated turret reciprocating device, a valve in said conduit, linkage associated with said valve and operable by said cams to restrict the flow of fluid expelled from said turret reciprocating device, said cams being adjustable relative to the direction of translation of said turret whereby the rate of travel of the turret may be altered within a reciprocative cycle when the said cam operates said valve to restrict the flow of fluid expelled from said turret reciprocating device.

17. A lathe comprising a bed, a tool turret, a fluid operated device for reciprocating said turret, a fluid operated device for rotatably indexing said turret, a cross slide tool carrier, a fluid operated device for reciprocating said cross slide, a rotatable work holder, a fluid operated chuck therefor, a fluid operated stock feed device, a turbine operated by the fluid expelled from said turret reciprocating device, a shaft driven thereby, cams mounted upon said shaft, valves operated by said cams, said valves operating respectively the cross slide tool carrier, the chuck and the stock feed fluid operating mechanisms, and means coordinated with said shaft to synchronize the rotation of said turret indexing device therewith.

18. A lathe comprising a bed, a motor mounted thereon, a drive shaft coupled therewith, a fluid pump driven by said drive shaft, a gear train including speed change gearing connected to said shaft and driven thereby, a counter shaft, gears mounted thereon, a reciprocable tool turret, rotatable tool supporting spindles mounted in said turret and intergeared with one of the gears on said counter shaft, a rotatable work holding spindle, a gear train therefor operatively driven by one of the gears on said counter shaft, fluid operated mechanism for reciprocating said turret, fluid connections between said fluid operating mechanism and said pump, fluid operated indexing mechanism for said turret, the actuation of said indexing mechanism being controlled through said fluid operated turret reciprocating mechanism, cross slides, fluid operated mechanism for reciprocating said slides, said fluid operated cross slide operating mechanism being controlled by the turret fluid operating mechanism, a fluid volumetric balance valve associated with said pump to compensate the feed rate of the said fluid operated reciprocating mechanism with the rate of the gear driven spindles under such loads as retard the speed of said motor.

19. In an automatic hydraulic lathe, a rotatable work holding spindle, a tool turret, fluid operated device for reciprocating said turret, fluid operated device for indexing said turret, cross slides, fluid operated device for reciprocating said cross slides, a chuck on said work holding spindle, fluid operated device for actuating said chuck, a stock feed mechanism, fluid operated device for actuating said stock feed mechanism, a fluid pump, conduits from said pump to said fluid operated turret indexing and reciprocating to, said cross slide and to said, chuck and stock feed devices, exhaust conduits therefrom, a shut-off valve in said exhaust conduits and common to each for arresting the flow of fluid therethrough, thereby restraining each of the fluid operated devices from actuation while maintaining fluid in the conduits which lead from the pump to the respective fluid operated devices aforesaid.

20. An automatic hydraulic screw machine comprising a bed, a rotatable work holder, a fluid operated chuck opening and closing mechanism comprising a cylinder and reciprocable piston, a fluid operated stock feed device comprising a cylinder and reciprocable piston, fluid connections intermediate said chuck opening and closing mechanism and said stock feed device, automatic valves in said fluid connections arranged to control the passage of fluid from the first named cylinder to the second named cylinder, and from the second named cylinder, thereby effecting the automatic operation of the stock feed device upon operation of the chuck opening and closing mechanism.

HARRY W. RUPPEL.